(12) United States Patent
Reddy et al.

(10) Patent No.: US 9,813,252 B2
(45) Date of Patent: Nov. 7, 2017

(54) MULTICASTING WITHIN A DISTRIBUTED CONTROL PLANE OF A SWITCH

(75) Inventors: Sreekanth Reddy, San Jose, CA (US); Ravi Shekhar, Sunnyvale, CA (US); Jeelani Syed, Bangalore (IN); Quaizar Vohra, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 354 days.

(21) Appl. No.: 13/053,801

(22) Filed: Mar. 22, 2011

(65) Prior Publication Data

US 2012/0069842 A1    Mar. 22, 2012

Related U.S. Application Data

(60) Provisional application No. 61/316,719, filed on Mar. 23, 2010, provisional application No. 61/316,720, filed on Mar. 23, 2010.

(51) Int. Cl.
*H04L 12/18* (2006.01)
*H04L 12/46* (2006.01)

(52) U.S. Cl.
CPC ............ *H04L 12/18* (2013.01); *H04L 12/185* (2013.01); *H04L 12/4641* (2013.01); *H04L 12/4675* (2013.01)

(58) Field of Classification Search
CPC ................ H04L 12/185; H04L 12/1886; H04L 12/4641; H04L 12/18; H04L 45/66; H04L 12/56

(Continued)

(56) References Cited

U.S. PATENT DOCUMENTS

| 599,518 A | 2/1898 | Charles Runge |
|---|---|---|
| 4,942,574 A | 7/1990 | Zelle |

(Continued)

FOREIGN PATENT DOCUMENTS

| CN | 1098236 A | 2/1995 |
|---|---|---|
| CN | 1167417 A | 12/1997 |

(Continued)

OTHER PUBLICATIONS

Extended Search Report for European Application No. 11158837.2, mailed Jun. 21, 2011.

(Continued)

*Primary Examiner* — Alex Skripnikov
*Assistant Examiner* — Lionel Preval
(74) *Attorney, Agent, or Firm* — Cooley LLP

(57) ABSTRACT

In some embodiments, a non-transitory processor-readable medium stores code representing instructions configured to cause a processor to receive, from an access switch, a first signal including forwarding state information associated with a first peripheral processing device from a set of peripheral processing devices. The code can further represent instructions configured to cause the processor to receive, from the first peripheral processing device, a second signal including a data packet. The code can further represent instructions configured to cause the processor to send, to a replication engine associated with the set of peripheral processing devices, a third signal such that the replication engine (1) defines a copy of the data packet, which is included within the third signal, and (2) sends, to a second peripheral processing device from the set of peripheral processing devices, a fourth signal including the copy of the data packet.

20 Claims, 6 Drawing Sheets

(58) Field of Classification Search
USPC .......... 370/388, 252, 390, 395.53, 389, 254,
370/428, 393; 709/238
See application file for complete search history.

(56) References Cited

U.S. PATENT DOCUMENTS

| | | | |
|---|---|---|---|
| 5,367,520 A | 11/1994 | Cordell | |
| 5,457,682 A | 10/1995 | Haag et al. | |
| 5,689,508 A | 11/1997 | Lyles | |
| 5,801,641 A | 9/1998 | Yang et al. | |
| 5,926,473 A | 7/1999 | Gridley | |
| 5,945,922 A | 8/1999 | Gao et al. | |
| 5,991,295 A | 11/1999 | Tout et al. | |
| 5,991,297 A | 11/1999 | Palnati | |
| 6,049,542 A | 4/2000 | Prasad | |
| 6,049,546 A | 4/2000 | Ramakrishnan | |
| 6,067,286 A | 5/2000 | Jones et al. | |
| 6,078,503 A | 6/2000 | Gallagher et al. | |
| 6,246,692 B1 | 6/2001 | Dai et al. | |
| 6,335,930 B1 | 1/2002 | Lee | |
| 6,473,428 B1 | 10/2002 | Nichols et al. | |
| 6,553,028 B1* | 4/2003 | Tang et al. | 370/389 |
| 6,587,470 B1 | 7/2003 | Elliot et al. | |
| 6,597,689 B1 | 7/2003 | Chiu et al. | |
| 6,665,495 B1 | 12/2003 | Miles et al. | |
| 6,751,238 B1 | 6/2004 | Lipp et al. | |
| 6,760,339 B1 | 7/2004 | Noel et al. | |
| 6,807,175 B1 | 10/2004 | Jennings et al. | |
| 6,829,237 B2 | 12/2004 | Carson et al. | |
| 6,850,704 B1 | 2/2005 | Dave | |
| 6,868,082 B1 | 3/2005 | Allen, Jr. et al. | |
| 6,876,652 B1 | 4/2005 | Bell et al. | |
| 6,981,078 B2 | 12/2005 | Paul | |
| 6,990,097 B2 | 1/2006 | Norman et al. | |
| 7,046,661 B2 | 5/2006 | Oki et al. | |
| 7,082,134 B1 | 7/2006 | Lim et al. | |
| 7,088,710 B1 | 8/2006 | Johnson et al. | |
| 7,173,931 B2 | 2/2007 | Chao et al. | |
| 7,177,919 B1 | 2/2007 | Truong et al. | |
| 7,178,052 B2 | 2/2007 | Hebber et al. | |
| 7,180,862 B2 | 2/2007 | Peebles et al. | |
| 7,230,947 B1 | 6/2007 | Huber et al. | |
| 7,248,760 B1 | 7/2007 | Corbalis et al. | |
| 7,295,566 B1 | 11/2007 | Chiu et al. | |
| 7,406,038 B1 | 7/2008 | Oelke et al. | |
| 7,408,927 B2 | 8/2008 | George | |
| 7,420,972 B1* | 9/2008 | Woo | H04L 45/00 370/351 |
| 7,428,219 B2 | 9/2008 | Khosravi | |
| 7,430,171 B2 | 9/2008 | Black et al. | |
| 7,489,625 B2 | 2/2009 | Varma | |
| 7,496,252 B1 | 2/2009 | Corbalis et al. | |
| 7,505,458 B2 | 3/2009 | Menon et al. | |
| 7,519,054 B2 | 4/2009 | Varma | |
| 7,564,869 B2 | 7/2009 | Cafiero et al. | |
| 7,586,909 B1 | 9/2009 | Walrand et al. | |
| 7,590,102 B2 | 9/2009 | Varma | |
| 7,606,262 B1 | 10/2009 | Beshai et al. | |
| 7,688,816 B2 | 3/2010 | Park et al. | |
| 7,720,064 B1 | 5/2010 | Rohde | |
| 7,746,799 B2* | 6/2010 | Kokot et al. | 370/252 |
| 7,751,416 B2 | 7/2010 | Smith et al. | |
| 7,792,017 B2 | 9/2010 | Lu et al. | |
| 7,830,905 B2 | 11/2010 | Scott et al. | |
| 7,843,836 B2 | 11/2010 | Elliott et al. | |
| 7,873,693 B1 | 1/2011 | Mehrotra et al. | |
| 7,899,930 B1 | 3/2011 | Turner et al. | |
| 7,936,776 B2 | 5/2011 | Deng | |
| 7,961,734 B2 | 6/2011 | Panwar et al. | |
| 8,054,832 B1 | 11/2011 | Shukla | |
| 8,265,071 B2 | 9/2012 | Sindhu et al. | |
| 2002/0019958 A1 | 2/2002 | Cantwell et al. | |
| 2002/0034183 A1 | 3/2002 | Prabhakar et al. | |
| 2002/0061020 A1 | 5/2002 | Chao et al. | |
| 2002/0064170 A1 | 5/2002 | Siu et al. | |
| 2002/0118692 A1 | 8/2002 | Oberman et al. | |
| 2002/0136484 A1 | 9/2002 | MacDonald | |
| 2002/0141397 A1 | 10/2002 | Piekarski et al. | |
| 2002/0145974 A1 | 10/2002 | Saidi et al. | |
| 2002/0159449 A1 | 10/2002 | Carson et al. | |
| 2002/0168012 A1 | 11/2002 | Ramaswamy | |
| 2003/0026287 A1 | 2/2003 | Mullendore et al. | |
| 2003/0081540 A1 | 5/2003 | Jones et al. | |
| 2003/0084219 A1 | 5/2003 | Yao et al. | |
| 2003/0123453 A1* | 7/2003 | Ooghe | H04L 12/1886 370/395.53 |
| 2003/0165140 A1* | 9/2003 | Tang et al. | 370/393 |
| 2003/0200330 A1 | 10/2003 | Oelke et al. | |
| 2003/0200473 A1 | 10/2003 | Fung | |
| 2003/0223420 A1 | 12/2003 | Ferolito | |
| 2004/0030766 A1 | 2/2004 | Witkowski | |
| 2004/0034864 A1 | 2/2004 | Barrett et al. | |
| 2004/0039986 A1 | 2/2004 | Solomon et al. | |
| 2004/0062202 A1 | 4/2004 | Storr | |
| 2004/0117438 A1 | 6/2004 | Considine et al. | |
| 2004/0165598 A1 | 8/2004 | Shrimali et al. | |
| 2004/0258003 A1* | 12/2004 | Kokot et al. | 370/254 |
| 2005/0002334 A1 | 1/2005 | Chao et al. | |
| 2005/0025141 A1 | 2/2005 | Chao et al. | |
| 2005/0055428 A1 | 3/2005 | Terai et al. | |
| 2005/0102549 A1 | 5/2005 | Davies et al. | |
| 2005/0114656 A1* | 5/2005 | Liu | H04L 12/185 713/163 |
| 2005/0120160 A1 | 6/2005 | Plouffe | |
| 2005/0175017 A1 | 8/2005 | Christensen et al. | |
| 2006/0018379 A1 | 1/2006 | Cooper | |
| 2006/0029072 A1 | 2/2006 | Perera et al. | |
| 2006/0092940 A1* | 5/2006 | Ansari | H04L 45/00 370/392 |
| 2006/0165070 A1 | 7/2006 | Hall et al. | |
| 2006/0165085 A1 | 7/2006 | Konda | |
| 2006/0165098 A1 | 7/2006 | Varma | |
| 2006/0165111 A1* | 7/2006 | Varma | H04Q 3/68 370/428 |
| 2006/0165112 A1 | 7/2006 | Varma | |
| 2006/0269187 A1 | 11/2006 | Lin et al. | |
| 2007/0002883 A1 | 1/2007 | Edsall et al. | |
| 2007/0006056 A1 | 1/2007 | Lehner et al. | |
| 2007/0091891 A1* | 4/2007 | Zwiebel | H04L 45/16 370/390 |
| 2007/0121499 A1 | 5/2007 | Pal et al. | |
| 2007/0189283 A1 | 8/2007 | Agarwal et al. | |
| 2007/0280253 A1 | 12/2007 | Rooholamini et al. | |
| 2007/0291535 A1 | 12/2007 | Eberle et al. | |
| 2008/0044181 A1 | 2/2008 | Sindhu | |
| 2008/0065749 A1 | 3/2008 | Kucukyavuz et al. | |
| 2008/0075071 A1 | 3/2008 | Beshai | |
| 2008/0080548 A1 | 4/2008 | Mullendore et al. | |
| 2008/0095160 A1* | 4/2008 | Yadav | H04L 12/1886 370/390 |
| 2008/0151863 A1 | 6/2008 | Lawrence et al. | |
| 2008/0159277 A1 | 7/2008 | Vobbilisetty et al. | |
| 2008/0175239 A1* | 7/2008 | Sistanizadeh et al. | 370/390 |
| 2008/0212472 A1 | 9/2008 | Musacchio et al. | |
| 2008/0219260 A1* | 9/2008 | Du | H04L 12/185 370/390 |
| 2008/0259555 A1 | 10/2008 | Bechtolsheim et al. | |
| 2008/0275975 A1 | 11/2008 | Pandey et al. | |
| 2008/0285449 A1 | 11/2008 | Larsson et al. | |
| 2008/0315985 A1 | 12/2008 | Johnsen et al. | |
| 2008/0317025 A1 | 12/2008 | Manula et al. | |
| 2008/0320117 A1 | 12/2008 | Johnsen et al. | |
| 2009/0037585 A1 | 2/2009 | Miloushev et al. | |
| 2009/0037607 A1* | 2/2009 | Farinacci | H04L 12/4641 709/249 |
| 2009/0052345 A1 | 2/2009 | Brown et al. | |
| 2009/0070775 A1 | 3/2009 | Riley | |
| 2009/0074414 A1 | 3/2009 | Miles et al. | |
| 2009/0129775 A1 | 5/2009 | Handelman | |
| 2009/0161692 A1 | 6/2009 | Hirata et al. | |
| 2009/0214208 A1 | 8/2009 | Beshai | |
| 2009/0279701 A1* | 11/2009 | Moisand | H04L 12/185 380/270 |

(56) References Cited

U.S. PATENT DOCUMENTS

| | | | |
|---|---|---|---|
| 2009/0300608 | A1 | 12/2009 | Ferris et al. |
| 2009/0323706 | A1 | 12/2009 | Germain |
| 2010/0017497 | A1 | 1/2010 | Brown et al. |
| 2010/0020806 | A1 | 1/2010 | Vahdat et al. |
| 2010/0061240 | A1 | 3/2010 | Sindhu et al. |
| 2010/0061241 | A1 | 3/2010 | Sindhu et al. |
| 2010/0061242 | A1 | 3/2010 | Sindhu et al. |
| 2010/0061367 | A1 | 3/2010 | Sindhu et al. |
| 2010/0061389 | A1 | 3/2010 | Sindhu et al. |
| 2010/0061391 | A1 | 3/2010 | Sindhu et al. |
| 2010/0061394 | A1 | 3/2010 | Sindhu et al. |
| 2010/0165876 | A1 | 7/2010 | Shukla et al. |
| 2010/0165877 | A1 | 7/2010 | Shukla et al. |
| 2010/0169467 | A1 | 7/2010 | Shukla et al. |
| 2010/0189121 | A1 | 7/2010 | Beshai |
| 2010/0192202 | A1 | 7/2010 | Ker |
| 2010/0306408 | A1* | 12/2010 | Greenberg et al. ........... 709/238 |
| 2011/0052191 | A1 | 3/2011 | Beshai |
| 2012/0320795 | A1 | 12/2012 | Shukla et al. |
| 2013/0003726 | A1 | 1/2013 | Sindhu et al. |

FOREIGN PATENT DOCUMENTS

| | | |
|---|---|---|
| CN | 101132286 A | 2/2008 |
| EP | 1128585 A2 | 8/2001 |
| EP | 1 318 628 A1 | 6/2003 |
| EP | 1 892 905 A1 | 2/2008 |
| EP | 1 924 030 A1 | 5/2008 |
| EP | 2 369 782 | 9/2011 |
| GB | 2 362 289 A | 11/2001 |

OTHER PUBLICATIONS

Search Report for European Application No. 09170037.7, mailed Dec. 10, 2009, 7 pages.

Search Report for European Application No. 12185735.3, mailed Oct. 29, 2012.

Chinese Office Action dated Nov. 30, 2012 issued in corresponding Chinese Application No. 200910246898.X.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

H. Jonathan Chao et al. "Matching Algorithms for Three-Stage Bufferless Clos Network Switches" IEEE Communications Magazine, Oct. 2003, pp. 46-54.

Jonathan S. Turner et al. "Multirate Clos Networks" IEEE Communications Magazine, Oct. 2003, pp. 1-11.

Office Action mailed Apr. 1, 2011 for U.S. Appl. No. 12/495,337 (17 pages).

Office Action mailed Dec. 13, 2011 for U.S. Appl. No. 12/495,337 (17 pages).

Office Action mailed May 11, 2011 for U.S. Appl. No. 12/495,344 (11 pages).

Office Action mailed Jan. 4, 2012 for U.S. Appl. No. 12/495,344 (13 pages).

Final Office Action mailed Sep. 13, 2012 for U.S. Appl. No. 12/495,344.

Office Action mailed Dec. 21, 2011 for U.S. Appl. No. 12/495,358 (12 pages).

Office Action mailed Jun. 15, 2011 for U.S. Appl. No. 12/495,361.

Office Action mailed Jan. 5, 2012 for U.S. Appl. No. 12/495,361.

Final Office Action mailed Sep. 13, 2012 for U.S. Appl. No. 12/495,361.

Office Action mailed Apr. 20, 2011 for U.S. Appl. No. 12/495,364.

Final Office Action mailed Oct. 21, 2011 for U.S. Appl. No. 12/495,364.

Office Action mailed Mar. 26, 2012 for U.S. Appl. No. 12/558,130.

Office Action mailed Jul. 17, 2012 for U.S. Appl. No. 12/495,337.

Office Action mailed Apr. 10, 2013 for U.S. Appl. No. 12/495,337.

Chinese Office Action mailed May 29, 2013 for Chinese Application No. 201110069908.4.

Chinese Office Action mailed Oct. 22, 2013 for Chinese Application No. 201110069908.4.

Chinese Office Action mailed Feb. 17, 2014 for Chinese Application No. 201110069908.4.

European Office Action mailed Oct. 4, 2013 for European Application No. 11158837.2.

Final Office Action dated Aug. 26, 2013 for U.S. Appl. No. 12/495,337.

Office Action dated Aug. 15, 2013 for U.S. Appl. No. 12/495,344.

Final Office Action dated Jan. 17, 2014 for U.S. Appl. No. 12/495,344.

Final Office Action dated Aug. 16, 2013 for U.S. Appl. No. 12/495,361.

Office Action dated Jan. 4, 2016 for U.S. Appl. No. 12/495,364.

Office Action dated Aug. 30, 2016 for U.S. Appl. No. 12/495,364.

Office Action dated Nov. 21, 2013 for U.S. Appl. No. 13/608,799.

Office Action dated May 11, 2015 for U.S. Appl. No. 14/621,892.

Final Office Action dated Jan. 21, 2016 for U.S. Appl. No. 14/621,892.

Office Action dated May 6, 2016 for U.S. Appl. No. 14/621,892.

Second Chinese Office Action dated Jul. 3, 2013 issued in corresponding Chinese Application No. 200910246898.X.

Final Office Action dated Jul. 24, 2014 for U.S. Appl. No. 13/608,799.

Office Action dated Dec. 9, 2016 for European Application No. 09170037.7.

Office Action dated Dec. 9, 2016 for European Application No. 12185735.3.

Office Action for European Application No. 09170037.7, dated Dec. 9, 2016.

Office Action for European Application No. 12185735.3, dated Dec. 9, 2016.

\* cited by examiner

MULTICASTING WITHIN A DISTRIBUTED CONTROL PLANE OF A SWITCH

CROSS-REFERENCE TO RELATED APPLICATIONS

The present application claims priority to U.S. provisional patent application No. 61/316,719 entitled "Multicasting within a Distributed Control Plane of a Switch," filed on Mar. 23, 2010, and to U.S. provisional patent application No. 61/316,720 entitled "Methods and Apparatus Related To Distributed Control Plane Switch Management," filed on Mar. 23, 2010, both of which are hereby incorporated by reference in their entireties.

This patent application is also related to co-pending U.S. patent application Ser. No. 12/495,337, entitled "Methods and Apparatus Related to Any-to-Any Connectivity within a Data Center" and filed on Jun. 30, 2009; to U.S. patent application Ser. No. 12/495,344, entitled "Methods and Apparatus Related to Lossless Operation within a Data Center" and filed on Jun. 30, 2009; to U.S. patent application Ser. No. 12/495,358, entitled "Methods and Apparatus Related to Low Latency within a Data Center" and filed on Jun. 30, 2009; to U.S. patent application Ser. No. 12/495,361, entitled "Methods and Apparatus Related to Flow Control within a Data Center Switch Fabric" and filed on Jun. 30, 2009; to U.S. patent application Ser. No. 12/495,364, entitled "Methods and Apparatus Related to Virtualization of Data Center Resources" and filed on Jun. 30, 2009; to U.S. patent application Ser. No. 12/558,130, entitled "Methods and Apparatus Related to a Low Cost Data Center Architecture" and filed on Sep. 11, 2009; and to U.S. patent application Ser. No. 12/558,126, entitled "Methods and Apparatus Related to a Flexible Data Center Security Architecture" and filed on Sep. 11, 2009. Each of the above-identified applications is incorporated herein by reference in its entirety.

BACKGROUND

Some embodiments described herein relate generally to multicast group functionality within a network, and more particularly to apparatuses for efficient management of multicast groups and distribution of data packets to members thereof.

Known network fabric systems often include one or more multicast groups each including one or more member devices. Many such multicast groups are configured using the Internet Group Management Protocol (IGMP), and are configured to broadcast data packets to each member of the multicast group. Often, the process of defining and sending copies of a broadcast data packet to each member device included in a multicast group is performed at a single device within the network, resulting in a bottleneck at this replication/distribution point. Thus, a need exists for apparatus to distribute the replication and distribution tasks associated with multicast group broadcasts to multiple devices within a network fabric system.

SUMMARY

In some embodiments, a non-transitory processor-readable medium stores code representing instructions configured to cause a processor to receive, from an access switch, a first signal including forwarding state information associated with a first peripheral processing device from a set of peripheral processing devices. The code can further represent instructions configured to cause the processor to receive, from the first peripheral processing device, a second signal including a data packet. The code can further represent instructions configured to cause the processor to send, to a replication engine associated with the set of peripheral processing devices, a third signal such that the replication engine (1) defines a copy of the data packet which is included within the third signal, and (2) sends, to a second peripheral processing device from the set of peripheral processing devices, a fourth signal including the copy of the data packet.

DETAILED DESCRIPTION

Figure 1:
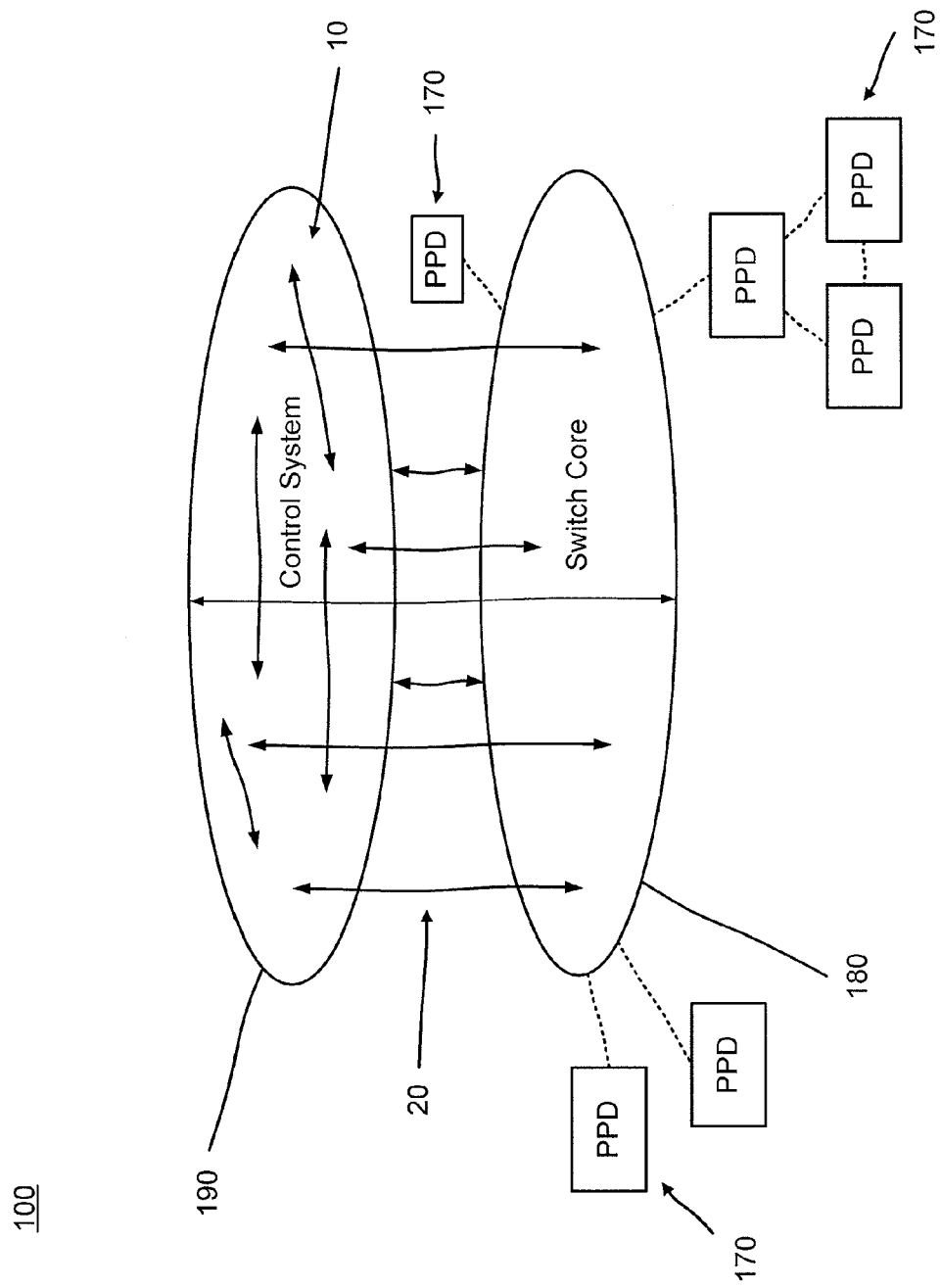
FIG. 1 is a schematic diagram that illustrates a data center (DC), according to an embodiment.

In some embodiments, a communications network can be operatively coupled to one or more access switches and/or compute devices. The communications network, access switches and/or compute devices can be included in a switch fabric system. The communications network can be, for example, a switch core or a multi-stage switch fabric.

In some embodiments, each access switch can be operatively coupled to one or more peripheral processing devices, and can provide connectivity, via the communications network, between the peripheral processing devices to which it is connected and to one or more other devices also coupled to the communications network (e.g., one or more other access switches, peripheral processing devices, compute devices, etc. An access switch can optionally include one or more network control entities (NCEs) configured to manage control plane information associated with one or more devices and/or entities included in the switch fabric system (e.g., forwarding state information of one or more peripheral processing devices). An access switch can also include one or more packet-forwarding engines (PFEs) configured to forward packets to one or more peripheral processing devices coupled thereto. In some embodiments, an NCE can be considered part of a control plane of the switch fabric system and a PFE can be considered part of a data plane of the switch fabric system.

Each compute device can be any combination of hardware and/or software (executing in hardware) configured to store, include, instantiate and/or host one or more logical entities associated with the switch fabric system. For example, a compute device can host one or more of: an NCE, a network management module (NMM), an L2 root module, an L3 root module, a multicast group management module (MGM), a replication engine, etc. In some embodiments, each of the above logical entities can be any combination of hardware and/or software (executing in hardware) operating at a compute device.

In some embodiments, a peripheral processing device can send a login request to an NCE hosted at an access switch. The login request can optionally have a Border Gateway Protocol (BGP) format, and can include identifier information of the peripheral processing device (e.g., Internet Protocol (IP) address, Media Access Control (MAC) address). Based at least in part on the login request, the NCE can store, at a memory, the identifier information. In some embodiments, the NCE can subsequently broadcast the identifier information and/or forwarding state information of the peripheral processing device to one or more other NCEs, NMMs, L2 root modules, L3 root modules and/or multicast group management modules.

In some embodiments, a peripheral processing device can send, to the NCE instantiated at the access switch, a request to join a multicast group. This request can optionally have an Internet Group Management Protocol (IGMP) format. Upon receipt of the request, the NCE can optionally send, based on the request, a BGP-formatted packet. The BGP-formatted packet can be configured to relay the multicast group join request of the peripheral processing device that sent the request to join the multicast group. In some embodiments, the NCE can send the BGP-formatted packet to, for example, an L2 root module, L3 root module and/or MGM. In such embodiments, the recipient module (be it an L2 root module, L3 root module or MGM) can accordingly add the requesting peripheral processing device to the specified multicast group. More specifically, the recipient module can store, at a memory, a record, file and/or association between the requesting peripheral processing device and an identifier of the multicast group (e.g., a multicast group identifier (ID), also referred to as a multicast key).

Having joined the multicast group, the peripheral processing device can subsequently send a data packet to one or more devices included in the multicast group. More specifically, the peripheral processing device can send a signal including the data packet to an access switch. The data packet can optionally include a packet header specifying a desired multicast group (via, for example, a multicast ID), a source identifier of the peripheral processing device and/or a VLAN of the peripheral processing device. The access switch can be configured to forward the data packet to an L2 root module associated with a VLAN in which the peripheral processing device and the access switch are included. In some embodiments, the L2 root module can next determine whether any devices included in the multicast group are likewise included in a different VLAN from that of the L2 root module, the access switch and the peripheral processing device.

If the L2 root module determines that all members of the specified multicast group are likewise members of the same VLAN as the L2 root module, the L2 root module can accordingly send the data packet to one or more replication engines. The one or more replication engines can each be associated with the same VLAN as the L2 root module, and can be hosted/instantiated at a compute device. In such embodiments, each replication engine can be associated with one or more member devices included in the specified multicast group, thus ensuring that each member device will receive a copy of the data packet. In some embodiments, a replication engine can be associated with multiple VLANs. In some embodiments, a single replication engine can be associated with a VLAN and/or multicast group. In some embodiments, upon receipt of the data packet, each replication engine can define a copy thereof and transmit the copy of the data packet to one or more peripheral processing devices from the multicast group. To do so, each replication engine can send the copy of the data packet via (1) the communications network and (2) one or more access switches to which a target peripheral processing device (i.e., a member of the multicast group) is connected.

If the L2 root module determines that at least one member of the specified multicast group is a member of a different VLAN from that of the L2 root module, the L2 root module can send the data packet to an L3 root module. In some embodiments, the L2 root module can also send, to the L3 root module, a separate indicator specifying the identity of the VLAN with which the L2 root module (and thus, the source peripheral processing device and access switch) is associated. In some embodiments, the L3 root module can be hosted/instantiated at a compute device operatively coupled to the communications network. In some embodiments, the compute device can be the same compute device as that at which the L2 root module is hosted. In other embodiments, the compute device can be a distinct compute device from the compute device at which the L2 root module is hosted.

Upon receipt of the data packet, the L3 root module can send, to an MGM module, the packet header included in the data packet. More specifically, the L3 root module can send, to the MGM module, the multicast ID of the specified multicast group. In some embodiments, the MGM module can be hosted at the same compute device as the L3 root module. Alternatively, the MGM module can be hosted at a distinct compute device from of the L3 root module. Based at least in part on the multicast ID, the MGM module can determine which VLANs included in the switch fabric system include member devices of the multicast group, and send a response including this information to the L3 root module.

Upon receipt of the above-described information, the L3 root module can determine which replication engines are associated with the two or more VLANs identified in the response received from the MGM module. Then, based on this determination, the L3 root module can send, to the replication engines, the data packet or a copy thereof.

Upon receipt of the data packet or data packet copy, each of the replication engines can define a copy of the data packet and send the same to one or more peripheral processing devices included in the multicast group and a VLAN with which that replication engine is associated. In some embodiments, any of the replication engines can be located at a single compute device and/or located at various compute devices in groups of one or more.

FIG. 1 is a schematic diagram that illustrates a data center (DC) 100 (e.g., a super data center, an idealized data center), according to an embodiment. The data center 100 includes a switch core (SC) 180 operably connected to various types of peripheral processing devices 170 (e.g., compute nodes, service nodes, routers, and storage nodes). As shown in FIG. 1, a distributed control system 190 is configured to facilitate (e.g., control, manage) operation of the switch core 180. In some embodiments, the switch core 180 can be referred to as a data plane or as a switch fabric and the distributed control system 190 can be referred to as a control plane or as a distributed control plane. In some embodiments, the data center 100 can be referred to as a data center fabric (DCF). In some embodiments, the data center 100 can have an active portion and a back-up portion.

In some embodiments, the switch core 180 and the distributed control system 190 can collectively (or individually) be referred to as a "network side" of the data center 100, and the network elements outside of the switch core 180 and the data control system 190 can be referred to as a "server side" of the data center 100. In some embodiments, one or more portions of the switch core 180 and/or the distributed control system 190 can be included in the server side of the data center 100. In some embodiments, one or more network elements outside of the switch core 180 and/or the distributed control system 190 can be included in the network side of the data center 100.

The distributed control system 190 can include various network elements such as routing switches, routing engines (REs), and/or so forth. The distributed control system 190 can be a network of elements configured to manage (e.g., process, distribute, define) various types of control plane information used by the switch core 180 so that the switch core 180 can operate in a desirable fashion. In some embodiments, the control plane information can include information used to manage the switch core 180 and/or information used to manage the distributed control system 190. In some embodiments, the control plane information can include, for example, provisioning information, virtual local area network (VLAN) information, routes, forwarding states, configuration information, and/or so forth. In some embodiments, the control plane information can be defined by and/or can include information associated with (e.g., received from) the switch core 180, the distributed control system 190, and/or defined by, for example, a network administrator. In some embodiments, at least a portion of the switch core 180 and a portion of the distributed control system 190 can be included and/or located in the same physical device(s).

As represented by double-headed arrows 20 shown in FIG. 1, the distributed control system 190 (e.g., network elements of the distributed control system 190) and the switch core 180 (e.g., network elements of the switch core 180) can be configured to exchange various signals. The signaling 20 can be, for example, related to the exchange of control plane information.

In addition, network elements within the distributed control system 190 can be configured to exchange signals with (e.g., communicate with) one another as represented by double-headed arrows 10. In some embodiments, signaling represented by arrows 10 within the distributed control system 190 (e.g., between components of the distributed control system 190) can be related to, for example, the exchange of and/or definition of control plane information. In some embodiments, one or more of the network elements (e.g., packet forwarding engine (PFE), top-of-rack (TOR) device, linecards) of the switch core 180 and/or one or more of the network elements (e.g., routing engines) of the distributed control system 190 can be referred to as intelligent network elements (INEs) (also can be referred to as an independent network elements). Mechanisms for the exchange of control plane information within the DCF (e.g., within the distributed control system 190, between the distributed control system 190 and the switch core 180) are described herein.

In some embodiments, one or more of the INEs of the switch core 180 and/or distributed control system 190 can be associated with a layer-2 (L2) domain (e.g., an L2 broadcast domain) or a layer-3 (L3) domain (e.g., an L3 broadcast domain). In some embodiments, the L2 broadcast domain can be shared by multiple INEs/virtual DCFs (VDCFs) over a single DCF fabric. More details related to a VDCF are set forth below. In some embodiments, data traffic between the INEs/VDCFs for a domain can be exchanged using the switch fabric 180. In some embodiments, one or more L2-domains can be assigned an identifier (ID) which can be common across the INEs/VDCFs that are part of that L2-domain and is used as part of the fabric notification for data packets. In some embodiments, an L2-domain identifier (ID) can also be used for exchanging control information between the member INEs/VDCFs corresponding to that L3-domain (e.g. routes and nexthops). With respect to configuration, an L2-domain can correspond to a VLAN name configured on a DCF and can be shared by one or more of INEs that are members of that VDCF. Across VDCFs, an L2-domain can correspond to a configuration used for normalizing VLAN names used in those VDCFs. In some embodiments, this configuration stanza can be referred to as equivalence-classes.

In some embodiments, an L3 routing domain can be shared by multiple INEs/VDCF over a single DCF fabric. For example, data traffic between the INEs/VDCFs for that domain can be exchanged using the DCF fabric. In some embodiments, each L3-domain can be assigned an ID which can be common across the INEs/VDCFs that are part of the L3-domain and can be used for exchanging control information corresponding to that L3-domain (e.g. routes and nexthops). For configuration purposes, an L3-domain can correspond to a routing-instance name configured on a VDCF and can be shared by one or more INEs that are members of that VDCF. Across VDCFs, an L3-domain can correspond to a configuration used for normalizing routing-instance names used in those VDCFs. In some embodiments, this configuration stanza can be referred to as equivalence-classes.

In some embodiments, one or more of the peripheral processing devices 170 can be configured to communicate via the switch core 180 of the data center 100. Specifically, the switch core 180 of the data center 100 can be configured to provide any-to-any connectivity between the peripheral processing devices 170 at relatively low latency. In some embodiments, the switch core 180 can have at least hundreds or thousands of ports (e.g., egress ports and/or ingress ports) through which peripheral processing devices 170 can transmit and/or receive data. In some embodiments, the peripheral processing devices 170 can be configured to send to and/or receive signals from the switch core 180 based on one or more protocols (e.g., an Ethernet protocol, a multi-protocol label switching (MPLS) protocol, a fibre channel protocol, a fibre-channel-over Ethernet protocol, an Infiniband-related protocol). In some embodiments, the peripheral processing devices can include one or more virtual resources such as virtual machines.

In some embodiments, the switch core 180 can be (e.g., can function as) a single consolidated switch (e.g., a single large-scale consolidated L2/L3 switch). In other words, the switch core 180 can be configured to operate as a single logical entity (e.g., a single logical network element) as opposed to, for example, a collection of distinct network elements configured to communicate with one another via Ethernet connections. The switch core 180 can be configured to connect (e.g., facilitate communication between) the peripheral processing device 170. In some embodiments, the switch core 180 can be configured to communicate via interface devices (e.g., access switches) configured to transmit data at a rate of at least 10 Gb/s. In some embodiments, the switch core 180 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch core 180 can be logically centralized, the implementation of the switch core 180 can be highly distributed, for example, for reliability. For example, portions of the switch core 180 can be physically distributed across, for example, many chassis. In some embodiments, for example, a processing stage of the switch core 180 can be included in a first chassis and another processing stage of the switch core 180 can be included in a second chassis. Both of the processing stages can logically function as part of a single consolidated switch.

In some embodiments, the switch core 180 can include an edge portion and a switch fabric portion (not shown). The edge portion can include edge devices (not shown) that can function as gateway devices between the switch fabric portion and the peripheral processing devices 170. In some embodiments, edge devices within the edge portion 185 can collectively have thousands of ports (e.g., 100,000 ports, 500,000 ports) through which data from the peripheral processing devices 170 can be transmitted (e.g., routed) into and/or out of one or more portions of the switch core 180. In some embodiments, the edge devices can be referred to as access switches, as network devices, and/or as input/output modules. In some embodiments, the edge devices can be included in, for example, a top-of-rack (TOR) of a chassis, and accordingly the edge devices can be referred to as TOR devices. In some embodiments, the INEs within the data center 100 can be configured to handle data based on different protocols.

In some embodiments, one or more of the components (e.g., a TOR device) within the data center 100 can include an application-specific integrated-circuit (ASIC). In some embodiments, the ASIC can be a packet parsing, classification, and/or forwarding ASIC. In some embodiments, the ASIC can be a buffering and fabric flow control ASIC. In some embodiments, the ASIC can be a fabric switch element ASIC.

In some embodiments, edge devices can be configured to send data to and/or receive data from the switch fabric portion of the switch core 180. In some embodiments, edge devices within the edge portion of the switch core 180 can be configured to classify, for example, data packets received at the switch core 180 from the peripheral processing devices 170. Specifically, the edge devices within the edge portion of the switch core 180 can be configured to perform Ethernet-type classification, which can include classification based on, for example, a layer-2 Ethernet address (e.g., a media access control (MAC) address) and/or a layer-4 Ethernet address (e.g., a universal datagram protocol (UDP) address). The edge devices (or other INEs of the data center 100) can include, for example, a packet forwarding engine (PFE) configured to perform, for example, a parsing function, a classifying function, a forwarding function, and/or a queuing and scheduling function. Thus, packet parsing, packet classifying, packet forwarding, and packet queuing and scheduling can occur prior to a data packet entering the switch core 180. Accordingly, these functions do not need to be performed at stages of the switch core 180. This can reduce the latency associated with the switch core 180. In some embodiments, for example, the end-to-end latency (i.e., time it takes to send data through the switch core 180 from an edge device to another edge device) can be lower than the end-to-end latency of a switch core 180 using an Ethernet protocol.

In some embodiments, one or more routing engines (REs) of the distributed control system 190 can be configured to provide control plane information to one or more PFEs of the switch core 180 so that the PFEs of the switch core 180 can appropriately process data received at the switch core 180. In some embodiments, one or more of the REs can be based on one or more virtual resources. In some embodiments, the distributed control system 190 can be defined, at least in part, by a network of REs and RE switches. In some embodiments, at least some of the signaling represented by arrows 10 shown in FIG. 1 can represent signaling between REs and PFEs. In some embodiments, at least some of the signaling represented by arrows 20 shown in FIG. 1 can represent signaling between REs that define at least some of the distributed control system 190.

Data can be processed at the peripheral processing devices 170 and/or at the switch core 180 based on different platforms. For example, communication between one or more of the peripheral processing devices 170 and an edge device at the edge portion can be a stream of data packets defined based on an Ethernet protocol or a non-Ethernet protocol. In some embodiments, various types of data processing can be performed at edge devices within the edge portion of the switch core 180 that may not be performed within the switch fabric portion of the switch core 180. For example, data packets can be parsed into cells at the edge device of edge portion of the switch core 180, and the cells can be transmitted from the edge device to the switch fabric portion of the switch core 180. The cells can be parsed into segments and transmitted within the switch fabric portion of the switch core 180 as segments (also can be referred to as flits in some embodiments). In some embodiments, the data packets can be parsed into cells at a portion of the switch fabric portion of the switch core 180. In some embodiments, a congestion resolution scheme can be implemented at and/or scheduling of transmission of data (e.g., cells) via the switch fabric portion of the switch core 180 can be performed at edge devices (e.g., access switches) within the edge portion of the switch core 180. Congestion resolution schemes and/or scheduling of transmissions of data, however, need not be performed within modules that define the switch fabric of the switch core 180.

In some embodiments, the above-described architecture can support forwarding of multi-destination frames. In some embodiments, these frames can be of one or more of the following types: L2 Broadcast, L2 Unknown Unicast, L2 Known Multicast (defined based on Generic Attribute Registration Protocol (GARP) and/or Generic Multicast Registration Protocol (GMRP)), L2 Unknown (non-IP) Multicast, L3(IP) Known Multicast (link-local and global) and L3 (IP) Unknown (i.e., sender-only) Multicast. Data frames defined according to one or more of the above-described multi-destination frame types can be collectively referred to as BUM (Broadcast, Unknown unicast and Multicast) traffic.

Figure 2:
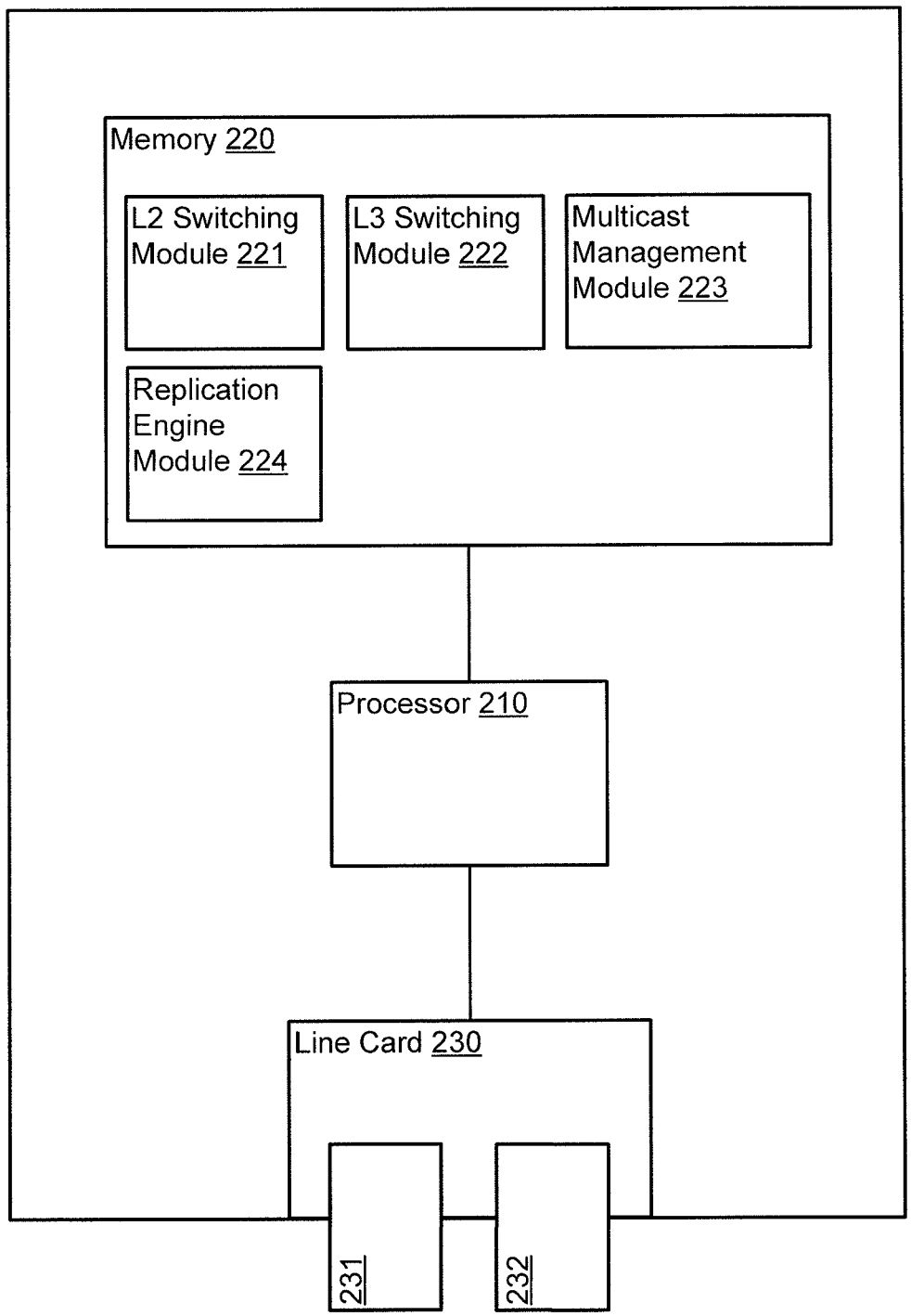
FIG. 2 is a schematic illustration of a compute device included in a data center, according to another embodiment.

FIG. 2 is a schematic illustration of a compute device included in a data center, according to another embodiment. More specifically, FIG. 2 is a system block diagram of a compute device 200, similar to the compute devices connected to a switch core (e.g., a switch fabric, a switch fabric system) of a data center as described in connection with FIG. 1 above. The compute device 200 includes a processor 210, a memory 220 and a line card 230. The memory 220 includes an L2 switching module 221, an L3 switching module 222, a multicast management module 223 and a replication engine module 224. The line card 230 includes the physical ports 231 and 232. The processor 210 is operatively coupled to the memory 220 and to the line card 230. In some embodiments, the line card 230 includes one or more processors and/or memories (not shown in FIG. 2). Although shown in FIG. 2 as being included in a single compute device, in some embodiments, one or more of the L2 switching module 221, the L3 switching module 222, the multicast management module 223 and the replication engine module 224 can be included in one or more other compute devices connected to a switch core of a datacenter. In this manner, the various functionalities of the L2 switching module 221, the L3 switching module 222, the multicast management module 223 and the replication engine module 224 can be distributed across one or more hardware devices, so as to improve performance and/or efficiency of the data center system.

The physical ports 231 and 232 can be configured to communicate with Ethernet and/or Fibre Channel peripheral processing devices, optionally via an Ethernet network. Additionally or alternatively, the physical ports 231 and 232 can be configured to communicate with Fibre Channel devices, such as Fibre Channel switches. For example, the physical ports 231 and 232 can implement a physical layer using twisted-pair electrical signaling via electrical cables or fiber-optic signaling via fiber-optic cables. In some embodiments, one of the physical ports 231 and 232 can implement one physical layer such as twisted-pair electrical signaling, and the other of the physical ports 231 and 232 can implement a different physical layer, such as fiber-optic signaling. Furthermore, the physical ports 231 and 232 can be configured to allow the compute device 200 to communicate with other peripheral processing devices, switching devices and/or edge devices (e.g., other compute devices (or "compute nodes")) via a common protocol such as Ethernet, Fibre Channel and/or Fibre Channel over Ethernet (FCoE). In some embodiments, one of the physical ports 231 and 232 can implement one protocol such as Ethernet/FCoE and the other of the physical ports 231 and 232 can implement a different protocol such as Fibre Channel. Thus, the compute device 200 can be in communication with multiple peripheral processing and/or switching devices using homogeneous or heterogeneous physical layers and/or protocols via the physical ports 231 and 232.

The L2 switching module 221 can be any hardware-based module and/or software-based module (executing in hardware) configured to receive and process information from one or more devices or modules capable of communicating on a layer-2 basis, i.e., communicating based at least in part on physical address (e.g., an Ethernet MAC address) of a sender and/or a recipient device or module. As shown in FIG. 2, the L2 switching module 221 is a software module included in the memory 220 of the compute device 200. In some embodiments, the L2 switching module 221 can receive, from a peripheral processing device, a fabric login request and/or a request to join a specified multicast group (via, for example an access switch). The request can optionally include forwarding state and/or other identifier information of or associated with the peripheral processing device. In such embodiments, the L2 switching module 221 can optionally store an association between the requesting peripheral processing device and the specified multicast group and/or send, to another compute device (e.g., a compute device including a multicast management module) a signal based at least in part on the request to join the multicast group. In some embodiments, the request to join the multicast group can include a multicast group identifier (ID) sufficient to uniquely identify the specified multicast group.

In some embodiments, the L2 switching module 221 can receive, from a peripheral processing device (e.g., a member device included in a specified multicast group), a data packet to be transmitted to one or more member devices included in a specified multicast group. The data packet can optionally include, in a packet header, an identifier of the specified multicast group (e.g., a multicast group ID). In such embodiments, the L2 switching module 221 can accordingly forward the received data packet to one or more other compute devices for copying and/or transmission of the data packet to the member devices. In some embodiments, one or more of the other compute devices can be and/or can include at least one replication engine module configured to: (1) define one or more copies of a data packet and (2) send the copies of the data packet to one or more devices (e.g., peripheral processing devices) included in a multicast group.

The L3 switching module 222 can be any hardware-based module and/or software-based module (executing in hardware) configured to receive and/or process information from and/or associated with one or more devices or modules capable of communicating on a layer-3 basis, i.e., communicating based at least in part on a network layer address (e.g., an Internet Protocol (IP) address) of a sender and/or recipient device or module. As shown in FIG. 2, the L3 switching module 222 is a software module included in the memory 220 of the compute device 200 and to be executed by the processor 210. In some embodiments, the L3 switching module 222 can receive, from a peripheral processing device included in a multicast group, a data packet to be transmitted to at least a portion of the multicast group. In such embodiments, the L3 switching module 222 can be configured to define and send, to one or more other compute devices physically and/or operatively coupled to a switch core (not shown in FIG. 2), a signal. The signal can include, for example, a request for any existing associations between one or more multicast groups, peripheral processing devices and/or VLANs included in a data center or a portion thereof. The request can include a request for identifiers of one or more multicast groups included in the data center and/or a request for identifiers of one or more VLANs included in the data center in of which one or more peripheral processing devices are a part. In this manner, the L3 switching module 222 can receive information sufficient to determine which peripheral processing devices of a data center or switch fabric system are associated with which multicast groups and/or VLANs.

Based at least in part on this information, the L3 switching module 222 can determine which VLANs are associated with the various member peripheral processing devices of a multicast group specified by a received packet. Then, based at least in part on this VLAN information, the L3 switching module 222 can further determine to which of a set of replication engines associated with each such VLAN to send the data packet for replication and subsequent transmission.

Finally, the L3 switching module 222 can optionally send the data packet to at least a first replication engine (e.g., a replication engine module instantiated/hosted at a compute device) for copying and transmission to one or more peripheral processing devices included in the specified multicast group.

In some embodiments, the L3 switching module 222 can send the data packet to a replication engine along with information associated with one or more other replication engines. The one or more other replication engines can optionally be associated with at least one VLAN, the VLAN including at least one peripheral processing device from the specified multicast group. Then, based at least in part on the replication engine information, the first replication engine can send the data packet to the one or more other replication engines for copying and transmission thereof to the remaining peripheral processing devices from the multicast group. In this manner, the L3 switching module 223 can send a single signal to a single replication engine such that multiple replication engines define copies of a packet included in the signal and then send the copies to multiple peripheral processing devices.

The multicast management module 223 can be any hardware-based module and/or software-based module (executing in hardware) configured to store and/or provide information associated with one or more multicast groups, peripheral processing devices and/or VLANs. As shown in FIG. 2, the multicast management module 223 is a software module included in the memory 220 of the compute device 200 and to be executed by the processor 210. In some embodiments, the multicast management module 223 can be configured to: (1) receive and/or store information associated with one or more virtual local area networks (VLANs), each such VLAN including one or more members of a single multicast group; (2) receive a request to join that multicast group; (3) receive a data packet for transmission to one or more members of the multicast group included in the one or more VLANs; and/or (4) send, to one or more replication engines associated with the one or more VLANs, the data packet, such that the data packet is replicated and transmitted to each member of the multicast group. In such embodiments, the multicast management module 223 can receive the above described information (e.g., the request to join the multicast group, the data packet) from another module instantiated at the compute device 200 and/or from a module instantiated at another compute device, such as an L2 switching module or an L3 switching module.

In some embodiments, the multicast management module 223 can be configured to store, at the memory 220, information associated with one or more multicast groups, including, for example, multicast group information (e.g., multicast group identifier (ID), multicast group name), multicast group member device information (e.g., device MAC addresses, device IP addresses), VLAN device membership information (e.g., association between a given device and a VLAN), etc. In such embodiments, the compute device 200 can be configured to reply to one or more queries for any or all of the above information.

The replication engine module 224 can be any hardware-based module and/or software-based module (executing in hardware) configured to define and/or transmit one or more data packets to one or more member devices (e.g., devices included in a multicast group). As shown in FIG. 2, the replication engine module 224 is included in the memory 220 of the compute device 200 and to be executed by the processor 210. In some embodiments, the replication engine module 224 can receive a data packet from another module and/or device operatively coupled to a common switch fabric and/or switch core. The replication engine module 224 can then optionally define one or more copies of the data packet, and accordingly send each copy of the data packet to a recipient peripheral processing device, such as a peripheral processing device included in an indicated multicast group. In some embodiments, the replication engine module 224 can be included in a set or "tree" comprising one or more replication engines. The set or tree of replication engines can optionally be associated with a specified VLAN and/or multicast group. In this manner, a first (or "root") replication engine from the tree of replication engines can receive a data packet, and accordingly send the data packet to one or more other replication engines included in the set/tree such that each replication engine defines and sends at least one copy of the data packet to an indicated peripheral processing device.

Figure 3:
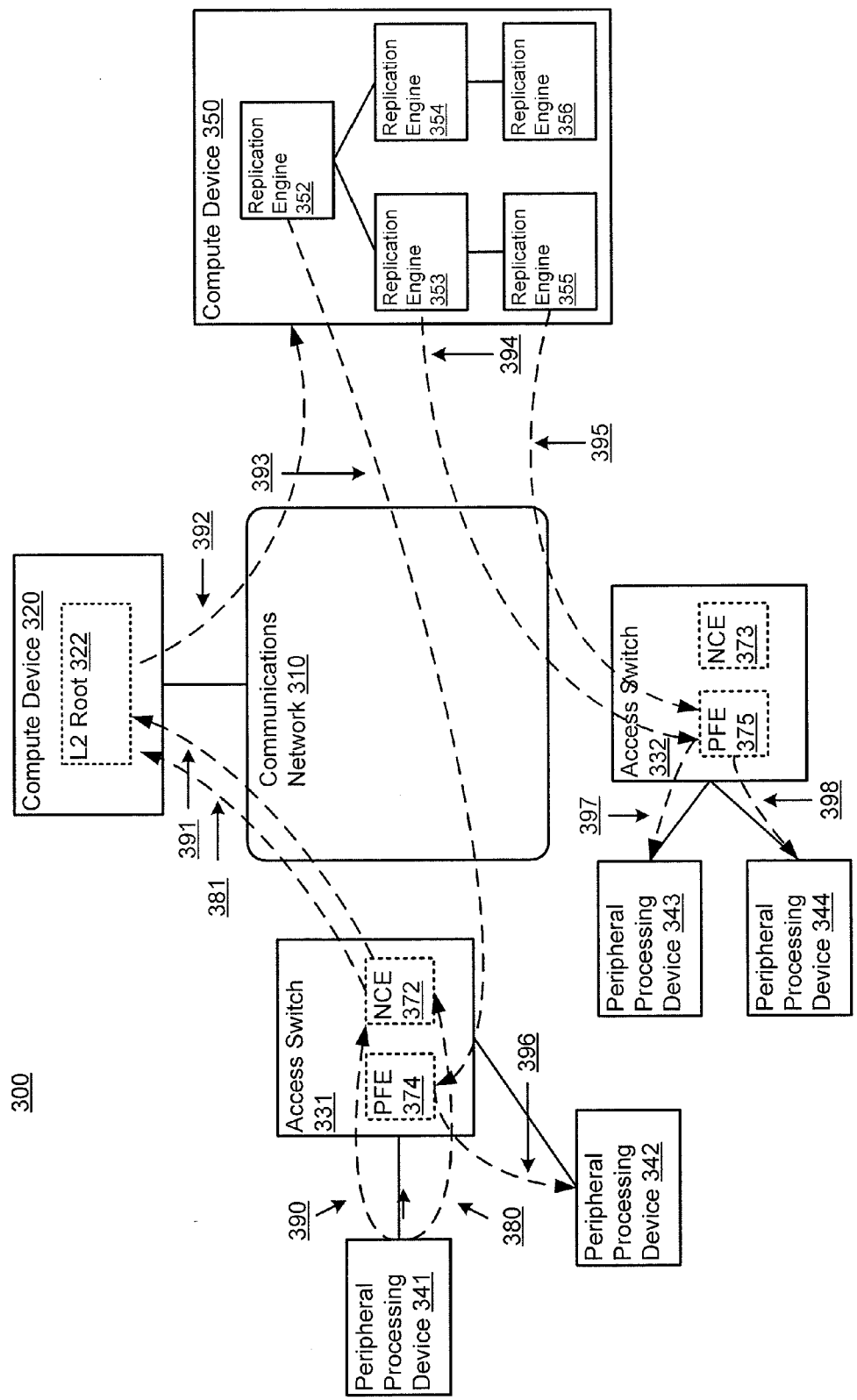
FIG. 3 is a schematic illustration of a switch fabric system configured to transmit data packets to a multicast group, according to another embodiment.

FIG. 3 is a schematic illustration of a switch fabric system configured to transmit data packets to a multicast group, according to another embodiment. More specifically, FIG. 3 illustrates a switch fabric system 300 that includes a communications network 310 operatively coupled to a compute device 320, access switches 331 and 332 and a compute device 350. The compute device 320 includes an L2 root module 322, and the compute device 350 includes replication engines 352-356. The access switches 331 and 332 include packet-forwarding engines (PFEs) 374 and 375, respectively, and network control entities (NCEs) 372 and 373, respectively. The access switch 331 is operatively coupled to peripheral processing devices 341 and 342. The access switch 332 is operatively coupled to peripheral processing devices 343 and 344.

The communications network 310 can be any combination of hardware and/or software (executing on hardware) configured to transmit data between any of the peripheral processing devices 341-344, the compute device 320, the compute device 350, and/or any of the access switches 331-332. In some embodiments, the communications network 310 can be a switch fabric or switch core, such as a multi-stage switch fabric. The communications network 310 can optionally transmit data based at least in part on the Ethernet, Fibre Channel, FCoE, and/or another network protocol (such as cell-based network transmission). Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety. In some embodiments, the communications network 310 can include one or more hardware devices configured to exchange data according to one or more of the above-enumerated network protocols. Additional details related to communications networks such as switch fabrics and multi-stage switch fabrics are disclosed in U.S. patent application Ser. No. 12/558,130 entitled "Methods and Apparatus Related to a Low Cost Data Center Architecture," filed Sep. 11, 2009, which is incorporated herein by reference in its entirety.

Each of the access switches 331-332 can be any combination of hardware and/or software (executing in hardware) situated at the edges of the communications network 310. As shown in FIG. 3, the access switches 331-332 can function as gateways to one or more peripheral processing devices coupled thereto. As also shown in FIG. 3, each of the access switches 331-332 can host one or more NCEs (described below), such as the NCE 372 hosted at the access switch 331 and the NCE 373 hosted at the access switch 332.

In some embodiments, each of the access switches 331-332 can be physically located within a chassis of the switch fabric system 300. In some embodiments, for example, each access switch 331-332 can be located within the same chassis. In other embodiments, each access switch 331-332 can be located within a different chassis. Structurally, the access switches 331-332 can function as both source access switches and destination access switches. Accordingly, the access switches 331-332 can send signals including data (e.g., a data stream of data frames, packets and/or data cells) to and receive signals including data from a data plane portion of the communications network 310, and to and/or from the peripheral processing devices 341-344. Each of the access switches 331-332 can optionally be referred to as an edge device and/or a top-of-the-rack "TOR" device.

As shown in FIG. 3, the access switches 331-332 are each configured to communicate with one another, the compute device 320 and/or the compute device 350 via a data plane portion of the communications network 310. Specifically, the data plane portion of the communications network 310 is configured to provide any-to-any connectivity, at relatively low latency, between the access switches 331-332. For example, the data plane portion of the communications network 310 can be configured to transmit (e.g., convey) data between the compute device 350 and the access switch 331 or between the access switch 332 and the compute device 320. In some embodiments, the communications network 310 can have at least hundreds or thousands of ports (e.g., egress ports and/or ingress ports) through which access switches 331-332, the compute device 320 and/or the compute device 350 can transmit and/or receive data. Additional details related to communications networks such as switch fabrics and multi-stage switch fabrics using cell-based network transmission are disclosed in U.S. patent application Ser. No. 12/495,337 entitled "Methods and Apparatus Related to Any-to-Any Connectivity within a Data Center" filed Jun. 30, 2009, which is incorporated herein by reference in its entirety.

As discussed in further detail herein, the access switches 331 and the access switch 332 can be configured to host one or more network control entities (NCEs) to manage, for example, the peripheral processing devices 341-342 and 343-344, respectively. As shown in FIG. 3, the access switch 331 hosts the NCE 372 to manage the peripheral processing devices 341 and 342, and the access switch 332 hosts the NCE 373 to manage the peripheral processing devices 343 and 344. In some embodiments, each of the NCE 372 and the NCE 373 can manage one or more physical ports of the access switches 331 and 332, respectively. Additionally, each of the NCE 372 and the NCE 373 can include forwarding state and/or other control plane information (e.g., MAC address information, IP address information, VLAN information, multicast group information) associated with the peripheral processing devices 341-342 and 343-344, respectively. The NCEs 372-373 can each be processes, applications, virtual machines and/or some other software module (executing in hardware) or a hardware module that is executed at a host device. Although not shown in FIG. 3, the compute device 320 and/or the compute device 350 can also optionally host one or more NCEs to manage, for example, one or more replication engines, one or more physical ports, etc. In some embodiments, the NCEs 372-373 can be considered a part of a control plane of the switch fabric system 300.

In some embodiments, each of the NCEs 372-373 can be defined and/or spawned by a controlling entity or module, such as a network management module (not shown in FIG. 3) hosted at a computed device (e.g., the compute device 320). The compute device 320 can provision one or more new NCEs based on a current amount of host protocol-based traffic and/or other load-balancing or other network management factors. Each of the NCEs 372-373 can optionally be configured to receive and respond to one or more host protocol requests, such as one or more Border Gateway Protocol (BGP), Internet Group Management Protocol (IGMP), Dynamic Host Configuration Protocol (DHCP), Address Resolution Protocol (ARP), Reverse Address Resolution Protocol (RARP) or other host protocol requests. As described above, in some embodiments, each of the NCEs 372-373 can be associated with one or more tables or data records (not shown in FIG. 3) storing address information for one or more devices included in the switch fabric system 300, such as an IP address and/or MAC address of one or more of the access switches 331-332 and/or one or more of the peripheral processing devices 341-344.

Each of the access switches 331 and 332 can be further configured to host one or more packet-forwarding engines (PFEs), such as the PFE 374 hosted at the access switch 331 and the PFE 375 hosted at the access switch 332. In some embodiments, each of the PFE 374 and the PFE 375 can be a hardware module and/or software-based module (executing in hardware) instantiated and/or hosted at a physical device (e.g., an access switch) and configured to transmit traffic between two or more devices. More specifically, each of the PFE 374 and the PFE 375 can receive one or more packets and forward the same to one or more peripheral processing devices operatively coupled to the access switch at which that PFE is hosted. For example, as shown in FIG. 3, the PFE 374 can be configured to forward data packets to the peripheral processing device 341 and/or to the peripheral processing device 342 (both operatively coupled to the access switch 331). Also in FIG. 3, the PFE 375 can be configured to forward data packets to the peripheral processing devices 343 and/or to the peripheral processing device 344 (both operatively coupled to the access switch 332).

The compute devices 320 and 350 can each be any combination of hardware and/or software (executing on hardware) configured to perform one or more network management tasks. In some embodiments, the compute devices 320 and 350 can be server devices. The compute devices 320 and 350 can be physically and/or operatively coupled to the communications network 310 via, for example, a wired and/or wireless Ethernet, Fibre Channel or other physical and/or logical connection.

As shown in FIG. 3, the compute device 320 includes and/or hosts the L2 root module 322. Although not shown in FIG. 3, in some embodiments, the switch fabric system 300 can include multiple compute devices that each include and/or host one or more L2 root modules similar to the L2 root module 322. In some embodiments, the L2 root module 322 can be a hardware-based module and/or a software-based module (executing in hardware) configured to store and/or transmit information (e.g., identifier information, multicast group information, VLAN information) associated with one or more devices (e.g., access switches 331-332 and peripheral processing devices 341-344) based at least in part on layer-2 information (e.g., physical address information) of the devices. The L2 root module 322 can also be configured to receive one or more multicast group join requests and/or one or more multicast data packets for transmission to members of a multicast group.

As shown in FIG. 3, the compute device 350 includes and/or hosts replication engines 352-356. In some embodiments, the replication engines 352-356 can each be a hardware-based module and/or a software-based module (executing in hardware) configured to receive and copy one or more data packets for transmission to one or more recipient devices (e.g., any of the peripheral processing devices 341-344).

Each of the peripheral processing devices 341-344 can be any combination of hardware and/or software (executing in hardware) capable of transmitting and/or receiving information across the communications network 310 via an access switch. In some embodiments, one or more of the above-enumerated peripheral processing devices can optionally be, for example, a compute node, a service node, a router, or a storage node. In some embodiments, one or more of the peripheral processing devices 341-344 can perform one or more computing tasks, such as one or more data storage, Software as a Service (SAS), web service, content request, or other computing tasks.

The peripheral processing devices 341-344 can be in communication with and/or operatively coupled to one or more physical ports of the access switches 331-332 (not shown in FIG. 3), using any suitable connection such as, for example, an optical connection (e.g., an optical cable and optical connectors), an electrical connection (e.g., an electrical cable and electrical connectors) and/or the like. As such, the peripheral processing devices 341-344 can be configured to send data (e.g., data frames, data packets, data cells, etc.) to and receive data from the access switches 331-332. In some embodiments, each connection between the peripheral processing devices 341-344 and the respective access switches 331-332 is a direct link. In other embodiments, the peripheral processing devices 341-344 can be operatively coupled to the access switches 331-332 via intermediate modules (not shown in FIG. 3).

In some embodiments, a peripheral processing device can send a request to join a multicast group included in the switch fabric system 300. For example, as shown in FIG. 3, the peripheral processing device 341 can send a signal 380 to the NCE 372. The signal 380 can include a request to join a specified multicast group and can have, for example, an IGMP format. In some embodiments, the request can include a multicast group ID associated with the specified multicast group.

The NCE 372 can next send, via the communications network 310, a signal 381 to the L2 root module 322. The signal 381 can be based at least in part on the signal 380, and can include a request to join the specified multicast group. In some embodiments, the signal 381 can have a BGP format configured to be processed by the L2 root module 322. Upon receipt of the signal 381 including the multicast join request, the L2 root module 322 can store, (e.g., at the memory 220 included in the compute device 200 shown in FIG. 2), an association between the requesting peripheral processing device and the multicast group (e.g., an identifier and/or forwarding state information of the peripheral processing device 341 and the multicast ID). Alternatively, the L2 root module 322 can send the multicast group join request and/or another signal based thereon (not shown in FIG. 3) to a multicast management module (e.g., the multicast management module 223 included in the memory 220 of the compute device 200 shown in FIG. 2). In some embodiments, the multicast management module can be hosted at the compute device 320 or at another compute device operatively coupled to the communications network 310. In this manner, the peripheral processing device 341 can join existing multicast group, and thus be configured to receive subsequent messages, signals and/or data packets associated therewith (via, for example, one of the replication engines 352-356).

The switch fabric system 300 can also be configured to transmit (e.g., multicast) one or more data packets to one or more members of a multicast group. For example, as shown in FIG. 3, the peripheral processing device 341 sends a signal 390 to the NCE 372 hosted at the access switch 331. The signal 390 can include, for example, a data packet intended to be sent to a multicast group of which the peripheral processing device 341 is a member. (Although not shown in FIG. 3, in some embodiments, each of the peripheral processing devices 341-344 can be included in a single multicast group.) In some embodiments, the data packet can be formatted according to the Ethernet and/or IPv4 or IPv6 protocols. In some embodiments, the data packet can have a packet header including a multicast ID of the multicast group.

Upon receipt of the signal 390, the NCE 372 can define and send, via the access switch 331, a signal 391. As shown in FIG. 3, the signal 391 can be sent via the communications network 310 to the L2 root module 322 of the compute device 320. In some embodiments, the signal 391 can include the data packet (and thus the packet header including the multicast ID). The signal 391 can optionally have a same or different format as that of the signal 390.

Upon receipt of the signal 391, the L2 root module 322 of the compute device 320 can perform a lookup and/or query on the multicast ID of the packet header included in the data packet. For example, the L2 root module 322 can send a first query to a database (not shown in FIG. 3) stored at the compute device 320 and/or an external device (not shown in FIG. 3). The first query can include, for example, the multicast ID. Based at least in part on a first response received to the first query, the L2 root module can determine an identifier (e.g., an IP address, a MAC address) of each member device or entity included in the multicast group associated with the multicast ID.

In some embodiments, the L2 root module 322 can send a second query configured to determine which replication engines from the replication engines 352-356 are associated with the various members of the multicast group (e.g., the peripheral processing devices 341-344), and thus to which replication engines the data packet should be sent by the L2 root module 322 for replication and transmission. (Alternatively, this second query can be included in the first query, such that the L2 root module 322 sends only a single query sufficient to retrieve/receive the multicast group and replication engine information described above.) Based at least in part on the second query, the L2 root module 322 can receive a second response including identifier information of at least one replication engine from the replication engines 352-356 associated with the multicast group. In some embodiments, the L2 root module 322 can receive forwarding state, login and/or other information associated with the replication engines 352-356 via a login or other signal received from the compute device 350 (not shown in FIG. 3). The login or other signal can optionally have a BGP format.

Having determined identifier information of each member device or entity included in the multicast group, the L2 root module 322 can send a signal 392 including the data packet to the compute device 350 (via the communications network 310). More specifically, the L2 root module 322 can send the signal 392 to one or more replication engines 352-356 associated with the multicast group (as indicated by the second response described above). Alternatively, the L2 root module 322 can send the signal 392 to a single replication engine instantiated at the compute device 350. In such embodiments, the single replication engine can be configured to determine which replication engines from the replication engines 352-356 to employ in defining and transmitting copies of the data packet. Having made this determination, the single replication engine can next propagate the signal 392 and/or a copy of the data packet to one or more additional recipient replication engines from the replication engines 352-356.

Upon receipt of the data packet via the signal 392 and/or another replication engine, each of the selected replication engines from the replication engines 352-356 can define a copy of the data packet. As shown in FIG. 3, each of the selected replication engines can next send, to a recipient peripheral processing device from the peripheral processing devices 341-344, a signal including that replication engine's copy of the data packet. In some embodiments, each replication engine can transmit a signal via the communications network 310. For example, as shown in FIG. 3, the replication engine 352 can send the signal 393 to the PFE 374 hosted at the access switch 331. The replication engine 353 can send the signal 394 to the PFE 375 hosted at the access switch 332. And, the replication engine 355 can send the signal 395 to the PFE 375. As described above, each of the signals 393-395 can include a copy of the data packet as defined by the replication engines 352, 353 and 355, respectively.

Upon receipt of the signal 393, the PFE 374 can define and send a signal 396 to the peripheral processing device 342. The signal 396 can include the copy of the data packet. Upon receipt of the signals 394-395, the PFE 375 can send signals 397 and 398 to the peripheral processing devices 343 and 344, respectively. As with the signal 396, the signals 397 and 398 can include a copy of the data packet for receipt and processing by the peripheral processing devices 343 and 344, respectively.

Figure 4:
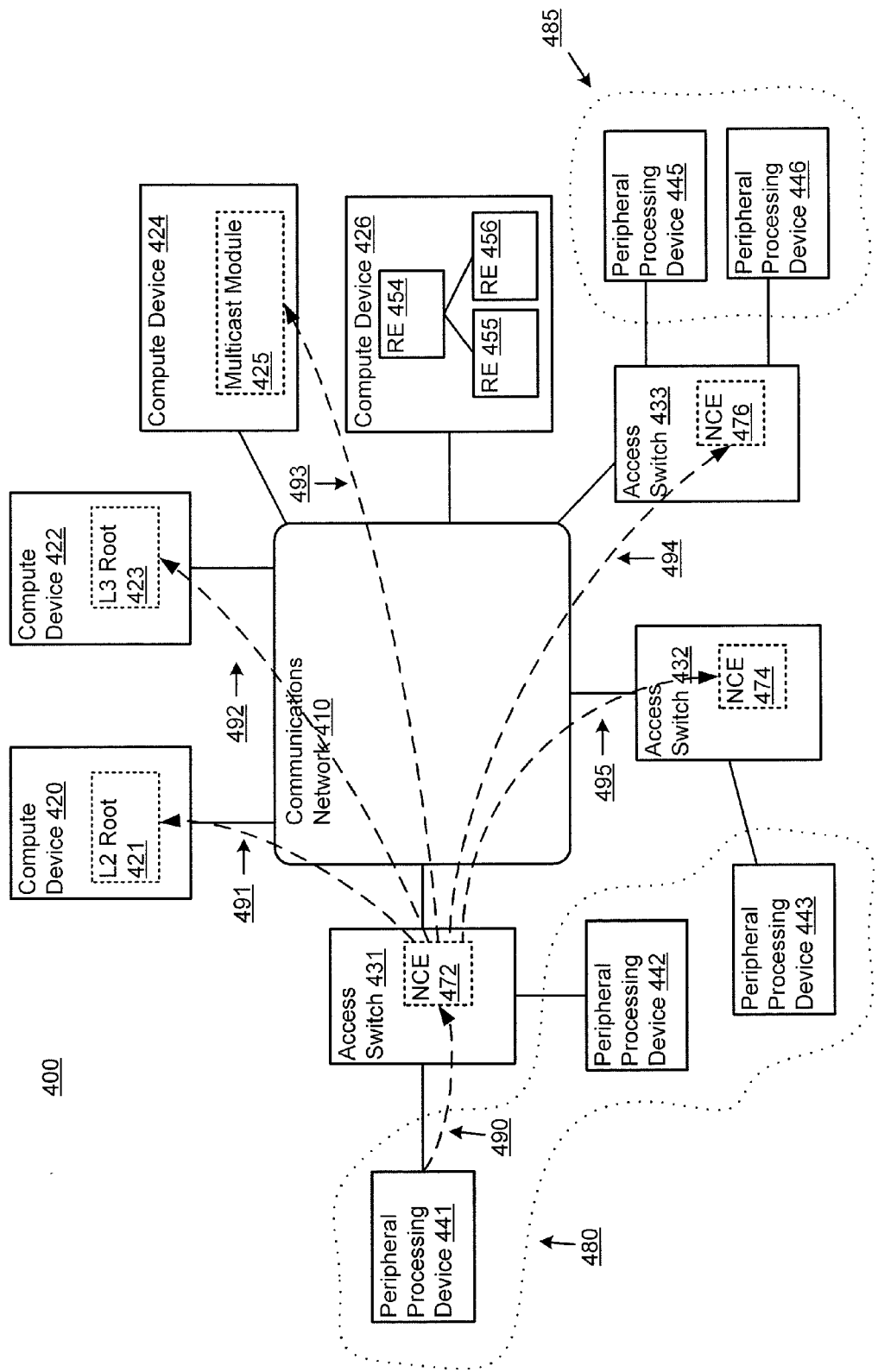
FIG. 4 is a schematic illustration of a switch fabric system configured to transmit data packets to a multicast group spanning multiple VLANs, according to another embodiment.

FIG. 4 is a schematic illustration of a switch fabric system configured to transmit data packets to a multicast group spanning multiple VLANs, according to another embodiment. More specifically, FIG. 4 illustrates a switch fabric system 400 that includes a communications network 410 operatively coupled to compute devices 420, 422, 424 and 426, and access switches 431-433. The compute device 420 hosts an L2 root module 421 and the compute device 422 hosts an L3 root module 423. The compute device 424 hosts a multicast group management (MGM) module 425, and the compute device 426 hosts a replication engine tree that includes replication engines 454-456. The access switches 431-433 include NCEs 472, 474 and 476, respectively. The access switch 431 is operatively coupled to peripheral processing devices 441 and 442. The access switch 432 is operatively coupled to peripheral processing device 443. The access switch 433 is operatively coupled to peripheral processing devices 445 and 446. The peripheral processing devices 441-443 are included in a VLAN 480, and the peripheral processing devices 445-446 are included in a VLAN 485.

The communications network 410 can be any combination of hardware and/or software (executing on hardware) configured to transmit data between any of the peripheral processing devices 441-443 and 445-446, the compute devices 420, 422, 424 and 426, and/or any of the access switches 431-433. In some embodiments, the communications network 410 can be a switch fabric or switch core, such as a multi-stage switch fabric. In some embodiments, the communications network 410 can be similar to the communications network 310 discussed in connection with FIG. 3 above.

Each of the access switches 431-433 can be any combination of hardware and/or software (executing in hardware) situated at the edges of the communications network 410. As shown in FIG. 4, the access switches 431-433 can function as gateways to one or more peripheral processing devices coupled thereto. As also shown in FIG. 4, each of the access switches 431-433 can host one or more NCEs (described below). In some embodiments, each of the access switches 431-433 can be physically located within a chassis of the switch fabric system 400. In some embodiments, the access switches 431-433 can send data to and receive data from a data plane portion of the communications network 410, and to and from the respective connected peripheral processing devices 441-443 and 445-446.

As shown in FIG. 4, the access switches 431-433 are each configured to communicate with one another and/or with any of the compute devices 420, 422, 424 and 426 via a data plane portion of the communications network 410. For example, the data plane portion of the communications network 410 can be configured to transmit (e.g., convey) data between the compute device 426 and the access switch 432 at relatively low latency.

As discussed in further detail herein, the access switches 431, 432 and 433 can be configured to host one or more network control entities (NCEs) to manage, for example, the peripheral processing devices 441-442, 443 and 445-446, respectively. As shown in FIG. 4, the access switch 431 hosts the NCE 472 to manage the peripheral processing devices 441 and 442, the access switch 432 hosts the NCE 474 to manage the peripheral processing devices 443 and the access switch 433 hosts the NCE 476 to manage the peripheral processing devices 445-446. Although not shown in FIG. 4, the compute devices 420, 422, 424 and 426 can also optionally host one or more NCEs to manage, for example, one or more replication engines, one or more physical ports, etc. The NCEs 472, 474 and 476 can each be similar to the NCEs 372-373 described in connection with FIG. 3 above.

The compute devices 420, 422, 424 and 426 can each be any combination of hardware and/or software (executing on/in hardware) configured to perform one or more network management tasks (e.g., control plane tasks). In some embodiments, the compute devices 420, 422, 424 and 426 can be physically and/or operatively coupled to the communications network 410 and can be similar to the compute device 320 and/or the compute device 350 discussed in connection with FIG. 3 above.

As shown in FIG. 4, the compute device 420 includes and/or hosts the L2 root module 421. Although not shown in FIG. 4, in some embodiments, the switch fabric system 400 can include multiple compute devices that each include and/or host one or more L2 root modules similar to the L2 root module 421. In some embodiments, the L2 root module 421 can be a hardware-based module and/or a software-based module (executing in hardware) similar to the L2 root module 322 discussed in connection with FIG. 3 above.

As also shown in FIG. 4, the compute device 422 includes and/or hosts the L3 root module 423. Although not shown in FIG. 4, in some embodiments, the switch fabric system 400 can include multiple compute devices that each includes and/or hosts one or more L3 root modules similar to the L3 root module 423. In some embodiments, the L3 root module 423 can be a hardware-based module and/or software-based module (executing in hardware) configured to store and/or transmit information (e.g., identifier information, multicast group information, VLAN information) associated with one or more devices (e.g., the access switches 431-433 and/or the peripheral processing devices 441-443 and 445-446) based at least in part on layer-3 information (e.g., network layer information).

The L3 root module 423 can also be configured to receive one or more multicast group join requests and/or one or more multicast data packets for transmission to a multicast group. In some embodiments, the L3 root module 423 can exchange information with the MGM module 425 hosted at the compute device 424. The exchanged information can include and/or can be based on, for example, multicast group, VLAN and/or member peripheral processing device information. Said differently, the L3 root module 423 can exchange information with the MGM module 425 regarding which multicast groups within the switch fabric system 400 include which peripheral processing devices and/or which VLANs include which peripheral processing devices. In this manner, the L3 root module 423 can also determine and/or exchange information with the MGM module 425 regarding which VLANs include one or more peripheral processing devices from a given multicast group.

The compute device 424 includes and/or hosts the MGM module 425. Although not shown in FIG. 4, in some embodiments, the switch fabric system 400 can include multiple compute devices that each include and/or host one or more MGM modules similar to the MGM module 425. In some embodiments, the MGM module 425 can be a hardware-based module and/or a software-based module (executing in hardware) configured to store information associated with one or more devices and/or entities included in the switch fabric system 400. For example, the MGM module 425 can include forwarding state information, multicast group affiliation/membership information, VLAN information, VDCF information, etc. As described above, the MGM module 425 can include associations between one or more peripheral processing devices and one or more VLANS and/or multicast groups. Although not shown in FIG. 4, the MGM module 425 can include VLAN information indicating that the VLAN 480 includes peripheral processing devices 441-443 and/or that the VLAN 485 includes the peripheral processing devices 445-446. The MGM module 425 can also optionally include multicast group information indicating that, for example, any of the peripheral processing devices 441-443 and/or the peripheral processing devices 445-446 is included in a single multicast group having a specified multicast group ID.

As shown in FIG. 4, the compute device 426 includes a tree of connected replication engines, namely the replication engines 454-456. In some embodiments, each of the replication engines 454-456 can be similar to any of the replication engines 353-356 discussed in connection with FIG. 3 above. In some embodiments, the replication engine 454 can be configured to receive a first data packet from, for example, the L2 root module 421 and/or the L3 root module 423, and accordingly, send the data packet to either or both of the replication engines 455-456. Alternatively, each of the replication engines 454-456 can receive the data packet directly from another network device or module (e.g., the L2 root module 421, the L3 root module 423). In this manner, each of the replication engines can receive a data packet to be copied and transmitted to one or more of the peripheral processing devices 441-443 and/or one or more of the peripheral processing devices 445-446. As discussed in connection with FIG. 3 above, a replication engine can be associated with a VLAN and/or one or more devices included therein, and can accordingly send copies of a data packet to each of the devices included in that VLAN (but not devices outside of that VLAN).

Each of the peripheral processing devices 441-443 and 445-446 can be any combination of hardware and/or software (executing in hardware) capable of transmitting and/or receiving information across the communications network 410 via an access switch. The peripheral processing devices 441-443 and 445-446 can be configured to send data (e.g., data frames, data packets, data cells, etc.) to and receive data from the access switches 431-433. In some embodiments, each of the peripheral processing devices 441-443 and 445-446 can be similar to one or more of the peripheral processing devices 341-344 of FIG. 3.

As shown in FIG. 4, in some embodiments, the peripheral processing device 441 can send, to the NCE 472 hosted at the access switch 431, a signal 490. The signal 490 can include a login request including, for example, forwarding state information of the peripheral processing device 441.

Upon receipt of the signal 490, the NCE 472 can optionally store and broadcast forwarding state information of the peripheral processing device 441. The forwarding state information can include, for example an IP address, a MAC address and/or other identifying information of the peripheral processing device 441. In such embodiments, the NCE 472 can optionally broadcast the forwarding state information of the peripheral processing device 441 to one or more other control plane entities of the switch fabric system 400. For example, the NCE 472 can send signals 491-495 to the L2 root module 421, the L3 root module 423, the MGM module 425, and the NCEs 474 and 476, respectively.

In some embodiments, each of the signals 491-495 can have a BGP format. Upon receipt of a signal including forwarding state information of the peripheral processing device 441, each control plane entity (e.g., the L2 root module 421, the L3 root module 423, the MGM module 425, the NCE 474 and/or the NCE 476) can store, at a memory, the updated forwarding state information. For example, a control plane entity can update a forwarding state table, file, record or database based at least in part on the forwarding state information. In this manner, the NCE 472 can ensure that subsequent signals and/or data packets sent to the peripheral processing device 441 can be properly routed through the communications network 410 to arrive at the peripheral processing device 441 via the access switch 431.

Although not shown in FIG. 4, the signal 490 can include a request to join a multicast group, the request having an IGMP format. In such embodiments, the request can optionally include a multicast group ID sufficient to identify the multicast group that the peripheral processing device 441 requests to join. In some embodiments, upon receipt of the signal 490, the NCE 472 can define and send to the L3 root module 423 and/or the MGM module 425, a BGP-formatted signal (not shown in FIG. 4) configured to request that the peripheral processing device 441 be included in/added to a multicast group. The signal can include, for example, the forwarding state information of the peripheral processing device 441 (described above) and/or a multicast ID of the desired multicast group. In some embodiments, the signal can be received at a virtual port, such as a virtual port of the L3 root module 423, a virtual port of the MGM module 425, etc.

Based at least in part on the received signal, the L3 root module 423 and/or the MGM module 425 can accordingly update, at a memory, membership information of the multicast group. The updated information can include, for example, a MAC address, IP address, VLAN and/or other information of the peripheral processing device 441. In this manner, the peripheral processing device 441 can be added to a specified multicast group and can thus be configured to receive subsequent multicast broadcasts and/or packets directed to the multicast group. In some embodiments, the MGM module can send, in response to the signal including the request, a second signal indicating that the requesting peripheral processing device(s) has been associated with the multicast ID, i.e., included in/added to the multicast group. In some embodiments, the second signal can be sent to the L3 root module 423 and can have a Protocol Independent Multicast (PIM) format.

Figure 5:
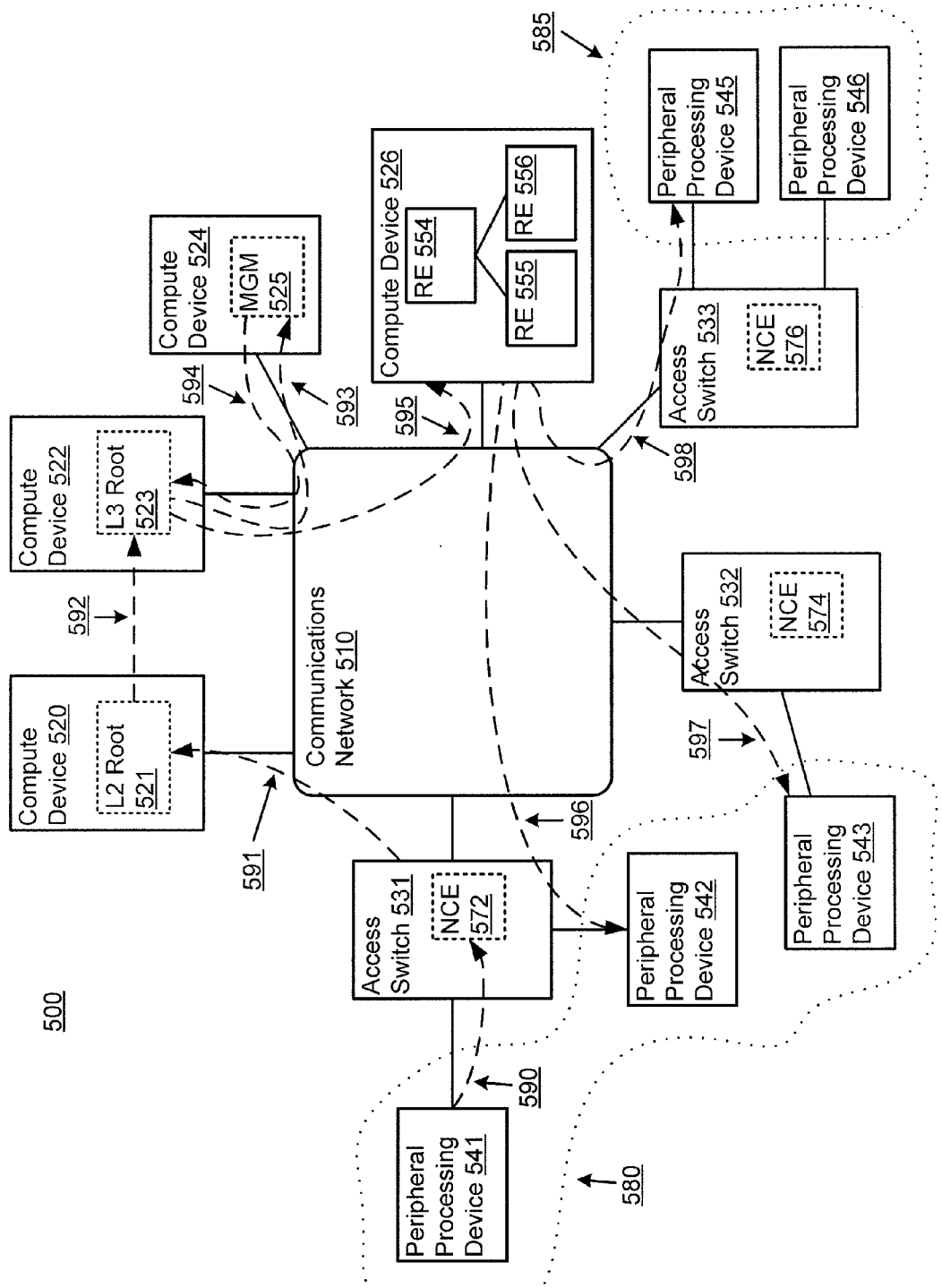
FIG. 5 is a schematic illustration of a switch fabric system configured to transmit data packets to a multicast group spanning multiple VLANs, according to another embodiment.

FIG. 5 is a schematic illustration of a switch fabric system configured to transmit data packets to a multicast group spanning multiple VLANs, according to another embodiment. More specifically, FIG. 5 illustrates a switch fabric system 500 that includes a communications network 510 operatively coupled to compute devices 520, 522, 524 and 526, and access switches 531-533. The compute device 520 hosts an L2 root module 521 and the compute device 522 hosts an L3 root module 523. The compute device 524 hosts an MGM module 525, and the compute device 526 hosts a replication engine tree that includes replication engines 554-556. The access switches 531-533 include NCEs 572, 574 and 576, respectively. The access switch 531 is operatively coupled to peripheral processing devices 541 and 542. The access switch 532 is operatively coupled to peripheral processing device 543. The access switch 533 is operatively coupled to peripheral processing devices 545 and 546. The peripheral processing devices 541-543 are included in a VLAN 580, and the peripheral processing devices 545-546 are included in a VLAN 585.

The communications network 510 can be similar to the communications network 410 described in connection with FIG. 4 above. The access switches 531-533 can be similar to the access switches 431-433 described in connection with FIG. 4 above. As shown in FIG. 5, the access switches 531-533 are each configured to communicate with one another and/or with any of the compute devices 520, 522, 524 and 526 via a data plane portion of the communications network 510. For example, the data plane portion of the communications network 510 can be configured to transmit (e.g., convey) data between the compute device 526 and the access switch 532 at relatively low latency.

Each of the access switches 531, 532 and 533 can be configured to host one or more network control entities (NCEs) to manage, for example, the peripheral processing devices 541-542, 543 and 545-546, respectively. As shown in FIG. 5, the access switch 531 hosts the NCE 572 to manage the peripheral processing devices 541 and 542, the access switch 532 hosts the NCE 574 to manage the peripheral processing devices 543 and the access switch 533 hosts the NCE 576 to manage the peripheral processing devices 545-546. Although not shown in FIG. 5, the compute devices 520, 522, 524 and 526 can also optionally host one or more NCEs to manage, for example, one or more replication engines, one or more physical ports, etc. The NCEs 572, 574 and 576 can each be similar to the NCEs 472-473 described in connection with FIG. 4 above.

The compute devices 520, 522, 524 and 526 can each be any combination of hardware and/or software (executing on/in hardware) configured to perform one or more network management tasks (e.g., control plane tasks). In some embodiments, the compute devices 520, 522, 524 and 526 can be physically and/or operatively coupled to the communications network 510 and can be similar to the compute device 420 and/or the compute device 450 discussed in connection with FIG. 4 above.

As shown in FIG. 5, the compute device 520 includes and/or hosts the L2 root module 521. Although not shown in FIG. 5, in some embodiments, the switch fabric system 500 can include multiple compute devices that each include and/or host one or more L2 root modules similar to the L2 root module 521. In some embodiments, the L2 root module 521 can be a hardware-based module and/or a software-based module (executing in hardware) similar to the L2 root module 322 discussed in connection with FIG. 3 above.

As also shown in FIG. 5, the compute device 522 includes and/or hosts the L3 root module 523. Although not shown in FIG. 5, in some embodiments, the switch fabric system 500 can include multiple compute devices, each of which includes and/or hosts one or more L3 root modules similar to the L3 root module 523. In some embodiments, the L3 root module 523 can be similar to the compute device 422 described in connection with FIG. 4 above.

The compute device 524 includes and/or hosts the MGM module 525. Although not shown in FIG. 5, in some embodiments, the switch fabric system 500 can include multiple compute devices that each include and/or host one or more MGM modules similar to the MGM module 525. In some embodiments, the MGM module 525 can be a hardware-based module and/or a software-based module (executing in hardware) configured to store information associated with one or more devices and/or entities included in the switch fabric system 500. The compute device 524 can be similar to the compute device 424 described in connection with FIG. 4 above.

As shown in FIG. 5, the compute device 526 includes a tree of connected replication engines, namely the replication engines 554-556. In some embodiments, each of the replication engines 554-556 can be similar to any of the replication engines 454-456 discussed in connection with FIG. 4 above.

Each of the peripheral processing devices 541-543 and 545-546 can be any combination of hardware and/or software (executing in hardware) capable of transmitting and/or receiving information across the communications network 510 via an access switch. The peripheral processing devices 541-543 and 545-546 can be configured to send data (e.g., data frames, data packets, data cells, etc.) to and receive data from the access switches 531-533. In some embodiments, each of the peripheral processing devices 541-543 and 545-546 can be similar to one or more of the peripheral processing devices 441-443 and 445-446 of FIG. 4.

In some embodiments, any of the peripheral processing devices 541-543 and 545-546 can be configured to send a signal to a multicast group spanning multiple VLANs. For example, as shown in FIG. 5, the peripheral processing device 541 can send a signal 590 to the NCE 472 hosted at the access switch 531. In some embodiments, the peripheral processing device 541 can be a member of a multicast group that also includes the peripheral processing devices 542-543 and 545-546, and the signal 590 can include a data packet to be transmitted to each member device included in the multicast group. The data packet can optionally include a packet header that includes, for example, a MAC address and/or an IP address of the peripheral processing device 541. The packet header can also include a multicast group ID associated with the multicast group.

The NCE 572 can next define and send a signal 591 to the L2 root module 521 hosted at the compute device 520. The signal 591 can include the data packet (and thus the packet header). In some embodiments, the signal can have an Ethernet and/or Internet Protocol format.

Upon receipt of the signal 591, the L2 root module 521 can determine, based on the packet header and/or multicast group ID, a multicast group to which the data packet is directed. Then, based at least in part on the multicast group ID, the L2 root module 521 can determine which devices are included in the multicast group. To do so, the L2 root module 521 can query a memory, database, or other data store, record or file (not shown in FIG. 5) local or external to the compute device 520. In some embodiments, the query can include a query to determine or receive information regarding the VLAN membership of each device included in the multicast group. In some embodiments, the query can be sent to (and results received from) an NCE hosted at the compute device 520 or at another device included in the switch fabric system 500. Alternatively, the query can be sent to a network management module hosted at the compute device 520 or at another device included in the switch fabric system 500.

Based at least in part on the multicast group membership and VLAN information described above, the L2 root module 521 can determine that one or more multicast group member devices is not included in the same VLAN as the peripheral processing device that sent the data packet. More specifically, the L2 root module 521 can determine that the peripheral processing device 541 (included in the VLAN 580) is in a different VLAN from, for example, the peripheral processing device 545 (which is also a member of the multicast group, but is included in the VLAN 585). In this instance, inasmuch as the L2 root module 521 is in direct communication with and/or authorized to administer over only devices included in the VLAN 580, the L2 root module 521 can determine that it is incapable of sending the data packet to the peripheral processing devices 545-546. Having made this determination, the L2 root module 521 can send a signal 592 to the L3 root module 523. The signal 592 can include the data packet. In some embodiments, rather than perform the determining step described above, the L2 root module 521 can alternatively forward the data packet (included in the signal 592) to the L3 root module 523 immediately upon receipt from the NCE 572.

Having received the signal 592 including the data packet, the L3 root module 523 can send a signal 593 to the multicast group management (MGM) module 525. The signal 593 can include, for example, the multicast group ID, and can be configured to retrieve, from the MGM module 525, information associated with each multicast group member device and VLAN. In some embodiments, the L3 root module 523 can send a signal 594 to the L3 root module 523, the signal 594 including information describing the VLAN membership of each device included in the multicast group. In some embodiments the signal 594 can further include information describing associations between one or more of the replication engines 554-556 and one or more of the VLANs 580 and 585.

Upon receipt of the signal 594, the L3 root module 523 can determine to which replication engines from the replication engines 554-556 it should send the data packet such that the data packet is copied and transmitted to each multicast group member device included in each of the VLANs 580 and 585. More specifically, the L3 root module 523 can determine that the replication engines 554 and 555 are associated with the VLAN 580 (and thus the peripheral processing devices 541-543), and that the replication engine 556 is associated with the VLAN 585 (and thus the peripheral processing devices 545-546).

Having made the above-described determinations, in some embodiments the L3 root module 523 can next send a signal 595 to the compute device 526. More specifically, the L3 root module 523 can send, via the communications network 510, the signal 595 to at least one of the replication engines 554-556 hosted at the compute device 526. As described in connection with FIG. 4 above, in some embodiments, the L3 root module 523 can send the signal 595 to each of the replication engines 554-556. As also described in connection with FIG. 4, in some embodiments, the L3 root module 523 can send the signal 595 to a single replication engine from the replication engines 554-556, which can subsequently propagate the data packet included in the signal 595 to the remaining replication engines in the tree of replication engines.

Upon receipt of the data packet (be it directly from the L3 root module 523 or another of the replication engines 354-356), each replication engine can define at least one copy of the data packet and transmit the same, via the communications network 510, to the peripheral processing devices included in the VLAN with which that replication engine is associated. More specifically, the replication engine 554 can define a copy of the data packet and send a signal 596 including the same. As shown in FIG. 5, the signal 596 can be sent to the peripheral processing device 542 via the communications network 510 and the access switch 531. The replication engine 555 can define a copy of the data packet and send a signal 597 including the same. The signal 597 can be sent to the peripheral processing device 543 via the communications network 510 and the access switch 532. Finally, the replication engine 556 can define a copy of the data packet and send a signal 598 including the same. The signal 598 can be sent to the peripheral processing device 545 via the access switch 533. PPD 546 does not receive a signal because it is not a member of the multicast group in this example.

Figure 6:
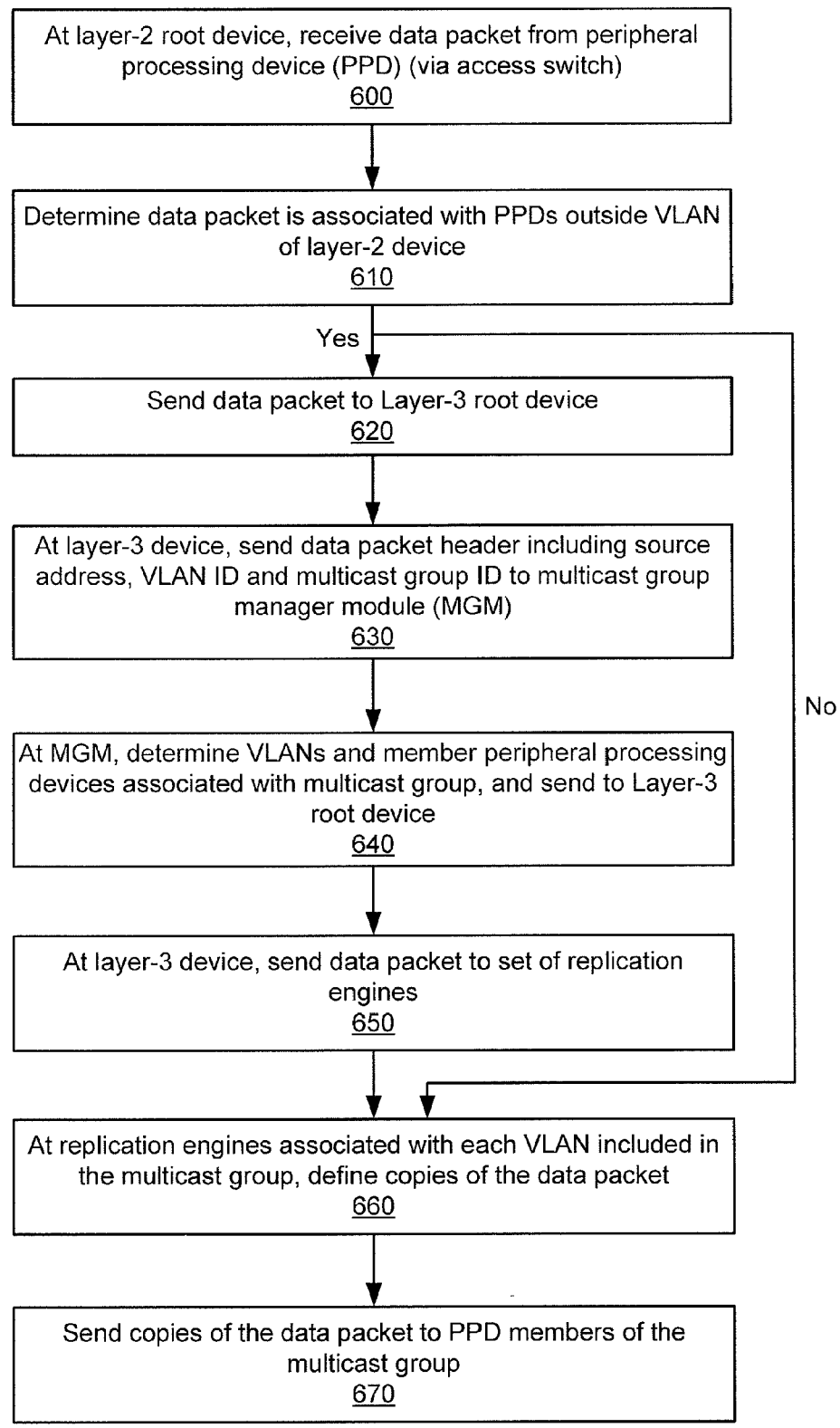
FIG. 6 is a flow chart describing a method of sending a data packet to a multicast group having members within multiple VLANs, according to another embodiment.

FIG. 6 is a flow chart describing a method of sending a data packet to a multicast group having members within multiple VLANs, according to another embodiment. More specifically, FIG. 6 describes a method of receiving a data packet from a peripheral processing device of a switch fabric and sending the data packet to multicast group devices associated with multiple VLANs.

A layer-2 root device can receive a data packet from a peripheral processing device via an access switch, 600. More specifically, a layer-2 root device or module ("L2 device") can receive the data packet via an access switch operatively coupled to a source peripheral processing device and to the L2 device. In some embodiments, each of the access switch and the L2 device can exchange information via a switch core (e.g., a multi-stage switch fabric) of a switch fabric system. In some embodiments, the L2 device can be a hardware-based module or a software-based module (executing in hardware) hosted at a compute device (or "compute node") coupled to the switch core.

The L2 device can determine that the data packet is associated with one or more peripheral processing devices included in a VLAN other than the VLAN ("VLAN A") with which the L2 device is associated, 610. For example, the L2 device can examine the data packet (e.g., a header of the data packet) to determine a multicast group ID included therein. Based at least in part on the multicast group ID, the L2 device can query a database or other data store to determine a set of member devices included in the multicast group and which (if any) VLANs of the switch fabric system include a member device from the set of devices. Based on this information, the L2 device can determine whether any of the multicast group member devices is included in a VLAN other than VLAN A. If the L2 device determines that all member devices included in the multicast group are included in VLAN A, the L2 device can send the data packet to one or more replication engines for copying and transmission of the data packet thereto (see steps 660-670 below).

Alternatively, if the L2 device determines that one or more member devices included in the multicast group is not included in VLAN A, the L2 device can send the data packet to a layer-3 root device, 620. The layer-3 root device can be, for example, a device and/or module ("L3 device") configured to store information regarding and/or manage one or more modules and/or devices based at least in part on the network layer of those modules and/or devices. In some embodiments, the L3 device can be operatively coupled to the L2 device via the switch core and/or directly.

The L3 device can receive the data packet and send a packet header of the data packet to a multicast group manager module (MGM), 630. In some embodiments, the packet header can include a source address of the sending peripheral processing device (e.g., an IP address, a MAC address) and a multicast group ID. The MGM module can be operatively coupled to the switch core and can be configured to exchange information with the L2 device, the L3 device and/or one or more replication engines also coupled to the switch core.

The MGM module can receive the packet header from the L3 device, 640. Based at least in part on the multicast group ID, the MGM module can determine the existence of one or more multicast group member devices (e.g., peripheral processing devices) and one or more VLANs included in the switch fabric system (e.g., the VLAN A). Having determined which multicast group devices are associated with which VLANs, the MGM module can send the association information to the L3 device.

Upon receipt of the association information described above, the L3 device can send one or more signals including the data packet to a set of replication engines, 650. More specifically, the L3 device can send, via the switch core, a signal including the data packet to a first replication engine from the set of replication engines (e.g., a "root node" of a replication engine tree structure). In this manner, the L3 device can send the data packet to a first replication engine, which can subsequently send the data packet to one or more other replication engines associated with one or more of the VLANs associated with one or more of the multicast group member devices. The replication engines can each be a hardware-based module and/or a software-based module (executing in hardware) hosted and/or instantiated at a device, such as a compute device operatively coupled to the switch core. In some embodiments, one or more of the replication engines can be hosted at one or more devices or servers positioned throughout the switch fabric system.

Each replication engine can define one or more copies of the data packet, 660. More specifically, each replication engine associated with a VLAN that includes at least one multicast group member device can define a copy of the data packet and include the same in one or more signals.

Having defined the one or more signals including the copies of the data packet, each replication engine can send its copy or copies of the data packet to the multicast group member devices with which it is associated, 670. More specifically, each replication engine can send at least one copy of the data packet to a peripheral processing device via the switch core and/or one or more access switches. In some embodiments, each replication engine can send a copy of the data packet to each multicast group member device included in the VLAN with which that replication engine is associated. In some embodiments, one or more replication engines can send a copy of the data packet to at least one—but not necessarily all—multicast group member devices included in the VLAN with which that replication engine is associated.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described. For example, multiple L2 root modules can be hosted at multiple compute devices operatively coupled to a common switch core.

What is claimed is:

1. A non-transitory processor-readable medium storing code representing instructions that when executed cause a processor to:

receive, at a first compute device and from a first access switch, a first signal including forwarding state information associated with a first peripheral processing device from a plurality of peripheral processing devices included in a multicast group associated with a plurality of virtual local area networks (VLANs);

receive, at the first compute device and from the first peripheral processing device via the first access switch, a second signal including a data packet including a multicast group identifier associated with the multicast group;

determine a VLAN membership of each peripheral processing device from a subset of the plurality of peripheral devices that is associated with the multicast group identifier;

when a first portion of the subset of peripheral processing devices is associated with a first VLAN from the plurality of VLANs and a second portion of the subset of peripheral devices is associated with a second VLAN from the plurality of VLANs and separate from the first VLAN:

identify a first replication engine from a group of replication engines, the group of replication engines being (1) instantiated at a second compute device separate from the first compute device (2) from a plurality of replication engines instantiated at the second compute device, and (3) associated with the multicast group, the first replication engine from the group of replication engines being associated with the first VLAN and not the second VLAN;

identify a second replication engine from the group of replication engines that is associated with the second VLAN and not the first VLAN;

send a third signal such that the first replication engine from the group of replication engines (1) defines a first copy of the data packet, which is included within the third signal, and (2) sends, via an access switch different than the first access switch, to a second peripheral processing device associated with the first VLAN and from the plurality of peripheral processing devices and different than the first peripheral processing device, a signal including the first copy of the data packet, and send a fourth signal such that the second replication engine (1) defines a second copy of the data packet and (2) sends the second copy of the data packet to a third peripheral processing device associated with the second VLAN and from the plurality of peripheral processing devices.

2. The non-transitory processor-readable medium of claim 1, wherein the group of replication engines includes at least three replication engines.

3. The non-transitory processor-readable medium of claim 1, wherein the first signal is based at least in part on a request to join the multicast group, the request being received from the first peripheral processing device and having an Internet Group Management Protocol (IGMP) format.

4. The non-transitory processor-readable medium of claim 1, wherein the data packet includes a multicast identifier (ID) associated with the multicast group.

5. The non-transitory processor-readable medium of claim 1, wherein at least one of the first signal or the second signal is received from the first access switch via a switch fabric.

6. The non-transitory processor-readable medium of claim 1, wherein the code further represents instructions that when executed cause the processor to:

receive, from a third replication engine from the plurality of replication engines, a fifth signal including forwarding state information of the first replication engine, the fifth signal having a Border Gateway Protocol (BGP) format.

7. The non-transitory processor-readable medium of claim 1, wherein the- second compute device is different from the first access switch.

8. A non-transitory processor-readable medium storing code representing instructions that when executed cause a processor to:

receive, at a first compute device, a first signal including a data packet, the data packet being associated with a multicast group associated with a plurality of virtual local area networks (VLANs);

receive a second signal indicating the plurality of VLANs, each VLAN from the plurality of VLANs being associated with at least one peripheral processing device from a plurality of peripheral processing devices included in the multicast group; and send, from the first compute device to a second compute device including a first replication engine (1) from a plurality of replication engines associated with the multicast group and (2) associated with a first VLAN from the plurality of VLANs and not each remaining VLAN from the plurality of VLANs, a third signal such that:

the first replication engine sends, via a first access switch, to a first peripheral processing device from the plurality of peripheral processing devices, a fourth signal including a first copy of the data packet, the first peripheral processing device being a member of the first VLAN from the plurality of VLANs, each replication engine from the plurality of replication engines being associated with at least one VLAN from the plurality of VLANs; and the first replication engine sends, to a second replication engine from the plurality of replication engines associated with the multicast group and associated with a second VLAN from the plurality of VLANs and not the first VLAN or each remaining VLAN from the plurality of VLANs, a fifth signal such that the second replication engine sends, via a second access switch, to a second peripheral processing device from the plurality of peripheral processing devices, a sixth signal including a second copy of the data packet, the second peripheral processing device being a member of the second VLAN from the plurality of VLANs.

9. The non-transitory processor-readable medium of claim 8, wherein the first replication engine is not associated with the second VLAN, and the second replication engine is not associated with the first VLAN.

10. The non-transitory processor-readable medium of claim 8, wherein the data packet includes (1) a source identifier associated with a third peripheral processing device from the plurality of peripheral processing devices, and (2) a multicast group identifier associated with the multicast group.

11. The non-transitory processor-readable medium of claim 8, wherein the second signal is received via a multi-stage switch fabric.

12. The non-transitory processor-readable medium of claim 8, wherein the first signal has a Border Gateway Protocol (BGP) format.

13. The non-transitory processor-readable medium of claim 8, wherein the first access switch and the second access switch are operatively coupled to a multi-stage switch fabric.

14. The non-transitory processor-readable medium of claim 8, wherein the second compute device is different from the first access switch and the second access switch.

15. An apparatus, comprising:

a multicast group management module configured to be instantiated at a compute device operatively coupled to a layer-2 device and a switch fabric, the layer-2 device to be associated with a virtual local area network (VLAN) from a plurality of VLANs, the multicast group management module configured to receive, from the layer-2 device, a first signal, the first signal being based at least in part on a request to join a multicast group (1) including a plurality of peripheral processing devices and (2) associated with each VLAN from the plurality of VLANs, the request being sent by a peripheral processing device associated with the VLAN, the multicast group management module configured to define, based on the first signal, an association between the VLAN and a portion of the multicast group, the multicast group management module configured to send, to a layer-3 device, a second signal indicating the association between the VLAN and the portion of multicast group such that (1) a replication engine is associated with the VLAN, the replication engine being from a plurality of replication engines associated with the multicast group and instantiated at the layer-3 device and (2) each remaining replication engine from the plurality of replication engines associated with the multicast group is not associated with the VLAN.

16. The apparatus of claim 15, wherein
the VLAN is a first VLAN,
the association is a first association,
the layer-2 device is a first layer-2 device,
the request to join the multicast group is a first request to join the multicast group,
the peripheral processing device is a first peripheral processing device,
the replication engine is a first replication engine from the plurality of replication engines,
the multicast group management module configured to receive, from a second layer-2 device associated with a second VLAN, a third signal, the third signal being based at least in part on a second request to join the multicast group, the second request being sent by a second peripheral processing device associated with the second VLAN,
the multicast group management module configured to define, based on the third signal, a second association between the second VLAN and the multicast group,
the multicast group management module configured to send, to the layer-3 device, a fourth signal indicating the second association such that (1) a second replication engine from the plurality of replication engines is associated with the second VLAN and (2) each remaining replication engine from the plurality of replication engines is not associated with the second VLAN.

17. The apparatus of claim 15, wherein
the multicast group management module is configured to be operatively coupled to the layer-3 device and the switch fabric,
the multicast group management module configured to receive, from the layer-3 device, a third signal including a request for a first VLAN identifier (ID) associated with the multicast group and a second VLAN ID associated with the multicast group,
the multicast group management module configured to send, in response to the request, a fourth signal including the first VLAN ID associated with the multicast group and the second VLAN ID associated with the multicast group.

18. The apparatus of claim 15, wherein the multicast group management module is configured to send, in response to the first signal, a third signal to the layer-3 device, the third signal being based at least in part on the request to join the multicast group, the third signal having a Protocol Independent Multicast (PIM) format.

19. The apparatus of claim 15, wherein the first signal is received at a virtual port of the multicast group management module, the first signal having a Border Gateway Protocol (BGP) format.

20. The apparatus of claim 15, wherein the peripheral processing device is operatively coupled to the switch fabric and to the layer-2 device.

* * * * *